United States Patent
Matsumura et al.

(10) Patent No.: US 9,438,912 B2
(45) Date of Patent: *Sep. 6, 2016

(54) VIDEO ENCODING/DECODING METHODS, VIDEO ENCODING/DECODING APPARATUSES, AND PROGRAMS THEREFOR

(75) Inventors: Masaaki Matsumura, Yokosuka (JP); Seishi Takamura, Yokosuka (JP); Atsushi Shimizu, Yokosuka (JP); Hirohisa Jozawa, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 14/000,624

(22) PCT Filed: Mar. 7, 2012

(86) PCT No.: PCT/JP2012/055787
§ 371 (c)(1),
(2), (4) Date: Aug. 21, 2013

(87) PCT Pub. No.: WO2012/121280
PCT Pub. Date: Sep. 13, 2012

(65) Prior Publication Data
US 2013/0336393 A1 Dec. 19, 2013

(30) Foreign Application Priority Data
Mar. 9, 2011 (JP) .................. 2011-051444

(51) Int. Cl.
*H04N 19/117* (2014.01)
*H04N 19/14* (2014.01)
(Continued)

(52) U.S. Cl.
CPC .......... *H04N 19/00896* (2013.01); *G06T 5/20* (2013.01); *H04N 19/117* (2014.11); *H04N 19/14* (2014.11); *H04N 19/176* (2014.11); *H04N 19/82* (2014.11)

(58) Field of Classification Search
CPC .. G06T 5/20; H04N 19/00896; H04N 19/17; H04N 19/14; H04N 19/176; H04N 19/82
USPC ........................................ 375/240.03, 240.26
See application file for complete search history.

(56) References Cited

U.S. PATENT DOCUMENTS

| 6,950,930 B2 | 9/2005 | Wise et al. |
| 7,388,621 B2 | 6/2008 | Hsu |

(Continued)

FOREIGN PATENT DOCUMENTS

| CA | 2 828 930 A1 | 9/2012 |
| CN | 101707716 A | 5/2010 |

(Continued)

OTHER PUBLICATIONS

Protter, Matan, et al., "Generalizing the Nonlocal-Means to Super-Resolution Reconstruction," IEEE Transactions on Image Processing, vol. 18, No. 1, Jan. 2009, pp. 36-51.

(Continued)

*Primary Examiner* — Behrooz Senfi
(74) *Attorney, Agent, or Firm* — Harness, Dickey & Pierce, P.L.C.

(57) ABSTRACT

The computational complexity of a denoising filter is reduced while suppressing a reduction in coding efficiency. In a video encoding/decoding apparatus which uses a loop filter, a deviation degree calculating unit calculates the degree of deviation between a denoising target pixel and a surrounding pixel using a decoded image. A template shape setting unit limits a template shape so that its size is proportional to the degree of deviation relative to the maximum value of the degree of deviation in the decoded image. When noise of the target pixel is removed, weighted in accordance with the degree of similarity between a template of the target pixel and a template of each of search points in a search shape and the weighted sum of pixel values at the search points, the loop filter performs template matching using the limited template shape and removes noise of the target pixel.

6 Claims, 20 Drawing Sheets

(51) Int. Cl.
   *H04N 19/82*    (2014.01)
   *G06T 5/20*     (2006.01)
   *H04N 19/176*   (2014.01)

(56) References Cited

U.S. PATENT DOCUMENTS

| | | | |
|---|---|---|---|
| 7,751,482 | B1 | 7/2010 | Srinivasan et al. |
| 2006/0056722 | A1 | 3/2006 | Moroney |
| 2008/0031518 | A1 | 2/2008 | Song et al. |
| 2008/0056366 | A1 | 3/2008 | Bhaskaran |
| 2009/0161988 | A1 | 6/2009 | Wredenhagen |
| 2010/0254454 | A1 | 10/2010 | Nakagawa |
| 2010/0272182 | A1 | 10/2010 | Watanabe |
| 2013/0136371 | A1* | 5/2013 | Ikai et al. ............ 382/224 |
| 2013/0208794 | A1* | 8/2013 | Jeong et al. ......... 375/240.13 |
| 2013/0343470 | A1* | 12/2013 | Matsumura et al. .... 375/240.29 |

FOREIGN PATENT DOCUMENTS

| | | |
|---|---|---|
| JP | 10-051793 A | 2/1998 |
| JP | 2008-205737 A | 9/2008 |
| JP | 2010-057157 A | 3/2010 |
| KR | 10-1998-0066891 A | 10/1998 |
| RU | 2 358 410 C2 | 6/2009 |
| RU | 2 402 070 C2 | 10/2010 |
| RU | 2 406 259 C2 | 12/2010 |
| RU | 2 408 159 C1 | 12/2010 |
| RU | 2 409 005 C2 | 1/2011 |
| WO | 2008/075247 A1 | 6/2008 |
| WO | 2009/133844 A1 | 11/2009 |

OTHER PUBLICATIONS

Wang, Lei, et al., "Nonlocal Image Denoising Algorithm based on Image Statistic," 2010 IEEE International Conference on Progress in Informatics and Computing, Dec. 10, 2010, pp. 901-905.

Huang, Yu-Wen, et al., "TE1: Decoder-Side Motion Vector Derivation with Switchable Template Matching," Joint Collaborative Team on Video Coding (JCT-VC) of ITU-T SG16 WP3 and ISO/IEC JTC1/SC29/WG11, No. JCTVC-B076, 2nd Meeting: Geneva, Switzerland, Jul. 21-28, 2010.

Search Report, European Patent Application No. 12754377.5, Sep. 30, 2014.

Notice of Allowance of Patent, Korean Patent Application No. 10-2013-7020222, Feb. 2, 2015.

Decision on Grant, Russian Patent Application No. 2013140678, Feb. 9, 2015.

Office Action, Canadian Patent Application No. 2,827,625, Mar. 3, 2015.

Goossen, Andre, et al., "Medical X-ray image enhancement by intra-image and inter-image similarity," Proceedings of SPIE, vol. 7259, Medical Imaging 2009: Image Processing, Mar. 27, 2009.

Matsumura, Masaaki, et al., "Modifications of in-loop filter based on non-local means filter," Joint Collaborative Team on Video Coding (JCT-VC) of ITU-T SG16 WP3 and ISO/IEC JTC1/SC29/WG11, Doc. JCTVC-F047, 6th Meeting: Torino, Italy, Jul. 14-22, 2011.

Notice of Allowance, Taiwanese Patent Application No. 101107618, Feb. 26, 2015.

International Search Report, Application No. PCT/JP2012/055748, Jun. 12, 2012.

Search Report, European Patent Application No. 12754719.8, Sep. 30, 2014.

A. Buades, B. Coll, and J. M. Morel, "A non-local algorithm for image denoising", Proc. IEEE Int. Conf. on Computer Vision and Pattern Recognition, vol. 2, pp. 60-65, Jun. 2005.

Thomas Wiegand, Woo-JinHan, Benjamin Bross, Jens-Rainer Ohm, and Gary J. Sullivan, "WD1: Working Draft 1 of High-Efficiency Video Coding", ITU-T SG16 WP3 and ISO/IEC JTC1/SC29/WG11 3rd Meeting: Guangzhou, CN, Oct. 7-15, 2010.

Jin Wang et al., Fast non-local algorithm for image denoising, 2006 IEEE International Conference on Image Processing, IEEE, Oct. 8, 2006, p. 1429-1432.

Ming Li, An improved non-local filter for image denoising, International Conference on Information Engineering and Computer Science, 2009, ICIECS 2009, IEEE, Dec. 19, 2009, p. 1-4.

Rui Lai and Xuan-xuan Dou, Improved non-local means filtering algorithm for image denoising, 2010 3rd International Congress on Image and Signal Processing (CISP2010), IEEE, Oct. 16, 2010, vol. 2, p. 720-722.

Wen-Qiang Feng et al., A non-local bilateral filter for image denoising, 2010 International Conference on Apperceiving Computing and Intelligence Analysis (ICACIA2010), IEEE, Dec. 17, 2010, p. 253-257.

Takeshi Chujoh et al., Description of video coding technology proposal by Toshiba, Joint Collaborative Team on Video Coding (JCT-VC) of ITU-T SG16 WP3 and ISO/IEC JTC1/SC29/VVG11 1st Meeting: Dresden, DE, Document: JCTVC-A117, ITU-T, Apr. 2010.

Masaaki Matsumura et al., In-loop filter based on non-local means filter, Joint Collaborative Team on Video Coding (JCT-VC) of ITU-T SG16 WP3 and ISO/IEC JTC1/SC29/WG11 5th Meeting: Geneva, CH, Document: JCTVC-E206, ITU-T, Mar. 10, 2011.

International Search Report for PCT/JP2012/055787, ISA/JP, mailed Jun. 12, 2012.

Notice of Allowance, Korean Patent Application No. 10-2013-7021110, May 28, 2015.

Decision on Grant, Russian Patent Application No. 2013140540, May 8, 2015.

Office Action, Chinese Patent Application No. 201280011668.5, Jan. 7, 2016.

* cited by examiner

| a | b | c | d | e |
|---|---|---|---|---|
| f | g | h | i | j |
| k | l | z | m | n |
| o | p | q | r | s |
| t | u | v | w | x |

PIXEL POSITIONS THAT ARE TARGETS FOR CALCULATION OF DEGREES OF DEVIATION

PIXEL POSITIONS THAT ARE NOT TARGETS FOR CALCULATION OF DEGREES OF DEVIATION $$\text{SET SHAPE (DIAMETER)} = N \frac{\int_0^{Th_{Intensity}} f(DiffIntensity)}{\int_0^{Max} f(DiffIntensity)}$$

FIG. 15C $$VecIndex = \begin{cases} 0 & if & |dx|+|dy| < Th \\ 6 & else\,if & dy = 0 \\ 6 & else\,if & dx/dy < -8.0 \\ 7 & else\,if & dx/dy < -2.0 \\ 8 & else\,if & dx/dy < -1.0 \\ 9 & else\,if & dx/dy < -0.5 \\ 10 & else\,if & dx/dy < -0.125 \\ 1 & else\,if & dx/dy < 0.125 \\ 2 & else\,if & dx/dy < 0.5 \\ 3 & else\,if & dx/dy < 1.0 \\ 4 & else\,if & dx/dy < 2.0 \\ 5 & else\,if & dx/dy < 8.0 \\ 6 & else \end{cases}$$

FIG. 16A

SETTING TARGET

N PIXELS

OUTER EDGE OF TRANSFORMUNIT

FIG. 16B

| | VecIndex 1 | |
|---|---|---|
| VecIndex 6 | FLAT REGION | VecIndex 6 |
| | VecIndex 1 | |

FIG. 16C

| E | VecIndex 1 | F |
|---|---|---|
| VecIndex 6 | FLAT REGION | VecIndex 6 |
| G | VecIndex 1 | H |

A, B, C, D

SEARCH SHAPE
(AGGREGATE OF SEARCH POINTS)

VIDEO ENCODING/DECODING METHODS, VIDEO ENCODING/DECODING APPARATUSES, AND PROGRAMS THEREFOR

CROSS-REFERENCE TO RELATED APPLICATIONS

This application is a 371 U.S. National Stage of International Application No. PCT/JP2012/055787, filed Mar. 7, 2012. Priority is claimed on Japanese Patent Application No. 2011-051444, filed Mar. 9, 2011, the entire contents of which applications are incorporated herein by reference.

TECHNICAL FIELD

The present invention relates to video encoding/decoding technologies using a loop filter which reduces block noise and so on.

BACKGROUND ART

Terms used in the present description are defined as follows.

"Search shape": an aggregate of search points around a target pixel of template matching, or the shape formed by the aggregate.

"Template shape": a group of pixels used for calculating the degree of similarity between the target pixel and each search point when the template matching is performed, or the shape formed by the group of pixels. The same shape is used for a group of pixels around the target pixel and for a group of pixels around each search point, and the values of pixels at positions having the same relative positional relationship are compared with each other.

In the field of image processing, as a technique of reducing noise when an image is taken and a deterioration of a deteriorated image, various denoising filters have been proposed. Among other things, it is known that denoising filters in accordance with a non-local means method (refer to Non-Patent Document 1) demonstrate a high denoising effect. Hereinafter, denoising filters in accordance with the non-local means method are referred to as NLM filters.

FIG. 18 is a diagram describing an NLM filter. In FIG. 18, one square cell is a search point, and an aggregate of search points is a search shape. $P_0$ is a denoising target pixel, and $P_s$ is a pixel of a search point in a search target. $T_0$ and $T_s$ are template shapes, and the shape of the template shape $T_0$ of a comparison source is the same as that of the template shape $T_s$ of the search target.

In the NLM filter, corresponding pixels in the template shape $T_0$ of the comparison source and the template shape $T_s$ of the search target are compared with each other, and the degree of similarity between the templates is calculated. In general, calculation of the degree of similarity between templates uses a sum of squared difference (SSD) or a sum of absolute difference (SAD).

FIG. 19 is a diagram illustrating inputs and an output of an NLM filter execution unit. Basically, an NLM filter execution unit 1000 inputs four pieces of information including a denoising target image, a search shape, a template shape, and a denoising coefficient and generates a resultant denoised image. As the denoising coefficient, a variance is given as a typical value when an original image, to which no noise is applied, is available, and an appropriate value is set by a user when an original image is unavailable.

The NLM filter execution unit 1000 calculates a denoised pixel value for each pixel as follows. In the following, an example which uses SSD for calculating the degree of similarity between templates will be described.

(1) Variable SW of the sum of weights is initialized to 0 and variable SP of the sum of pixel values is initialized to 0.
(2) The following processes are repeated for all the search points within a search shape.
(2-1) SSD is calculated as the degree of similarity between templates.
(2-2) Weight W=exp (−SSD/denoising coefficient)
(2-3) Sum of weights SW=sum of weights SW+weight W
(2-4) Sum of pixel values SP=sum of pixel values SP+weight W×(pixel value of search point)
(3) Upon completion of the processes of (2) for all the search points within the search shape, a denoised pixel value of a denoising target pixel is obtained by the following equation.

(denoised pixel value)=sum of pixel values SP/sum of weights SW

The NLM filter execution unit 1000 performs a denoising process using a single value and a single shape for all the pixels of a denoising target image when a single value is given as each of the input denoising coefficient, the input search shape, and the input template shape, and performs a denoising process while switching a value and shapes for each corresponding point when a group of pieces of data corresponding to each pixel is given.

Moreover, in order to remove coding distortion, a denoising filter with a deblocking filter is installed in the "HM", which is a test model of "High Efficiency Video Coding" of next-generation video coding standards, for which international standardization activities are currently being performed by the "Moving Picture Experts Group (MPEG)" and the Video Coding Experts Group (VCEG)" (refer to Non-Patent Document 2).

PRIOR ART DOCUMENTS

Non-Patent Documents

Non-Patent Document 1: A. Buades, B. Coll, and J. M. Morel, "A non-local algorithm for image denoising", Proc. IEEE Int. Conf. on Computer Vision and Pattern Recognition, vol. 2, pp. 60-65, June, 2005.

Non-Patent Document 2: Thomas Wiegand, Woo-Jin Han, Benjamin Bross, Jens-Rainer Ohm, and Gary J. Sullivan, "WD1: Working Draft 1 of High-Efficiency Video Coding", ITU-T SG16 WP3 and ISO/IEC JTC1/SC29/WG11 3rd Meeting: Guangzhou, C N, 7-15 Oct., 2010.

SUMMARY OF INVENTION

Problems to be Solved by the Invention

As described above, in order to remove coding distortion, a denoising filter with a deblocking filter is installed in the "HM" of the "High Efficiency Video Coding" of the next-generation video coding standards, but it is conceivable that the coding efficiency be increased compared to conventional deblocking filters if the above NLM filter is introduced into the HM.

However, the computational complexity of the NLM filter is enormous, so that there is a possibility that a computation time required for decoding is greatly increased if a decoding apparatus calculates NLM filters for all the pixels.

As described above, template matching is performed on each denoising target pixel and each search point within an arbitrary search shape using an arbitrary template shape to calculate the degree of similarity between templates. As a result, assuming that, for example, the template shape is an N×N block and the search shape is M×M, the computational complexity of the order of $N^2 \times M^2$ is required for performing a denoising calculation for one pixel. Therefore, in order to use the NLM filter in a decoding apparatus and so on, a technology of reducing the computational complexity is required.

An object of the present invention is to solve the above problems and provide a technology of reducing the computational complexity of a denoising filter while suppressing a reduction in coding efficiency. It is to be noted that as the coding efficiency, for example, a BD-rate, which is one of international evaluation techniques and is calculated from the image quality and the amount of bits, is used herein.

Means for Solving the Problems

In order to solve the above problems, the present invention executes the following filter process in video encoding or video decoding using a loop filter which performs template matching between a template which is a comparison source for a denoising target pixel in a decoded image and a template for each of search points which are search targets within a search shape in the decoded image and removes noise of the target pixel using weights in accordance with the degrees of similarity between the templates and the weighted sum of pixel values at the search points.
(1) The degree of deviation between the target pixel and a surrounding pixel of the target pixel is calculated using the decoded image.
(2) The degree of deviation is used as an index used for limiting a template shape of a template, and a process of limiting the template shape is executed so that the lower the degree of deviation relative to the maximum value of the degree of deviation within the decoded image is, the smaller the template shape is.

Moreover, the following process (3) may be further added.
(3) An excessively allocated region in the template shape limited by the process (2) is detected, and the template shape is reset to further limit the template shape.

As described above, although conventionally a template shape is uniquely given for the entire frame as a fixed value, it is possible to reduce the computational complexity of template matching by introducing a process of limiting a template shape for each pixel with the above processes (1) and (2). Additionally, it is possible to further reduce the computational complexity by further executing the process (3).

Accordingly, it is possible to reduce the computational complexity of the loop filter while suppressing a reduction in coding efficiency of video encoding/decoding.

Advantageous Effects of Invention

In accordance with the present invention, it is possible to reduce the computational complexity while suppressing a reduction in coding efficiency by introducing a process of limiting a template shape to reduce the number of pixels in templates between which comparison is performed into a loop filter process in video encoding/decoding

BRIEF DESCRIPTION OF DRAWINGS

FIG. 15C is a diagram describing a method for allocating the numbers in the example of the edge direction detection method.
FIG. 16A is a diagram describing a calculation target region in an example of a template shape resetting method.
FIG. 16B is a diagram describing a feature of block noise in the example of the template shape resetting method.
FIG. 16C is a diagram describing the setting of four corners in the example of the template shape resetting method.

MODES FOR CARRYING OUT THE INVENTION

Hereinafter, embodiments of the present invention will be described with reference to drawings. First, examples of a video encoding apparatus and a video decoding apparatus to which embodiments of the present invention are applied will be described. It is to be noted that the video encoding apparatus and the video decoding apparatus described below are examples of apparatuses to which embodiments of the present invention are applied, and the embodiments of the present invention are not necessarily restricted by the configurations of these apparatuses.

Example of Application to Video Encoding Apparatus

Figure 1:
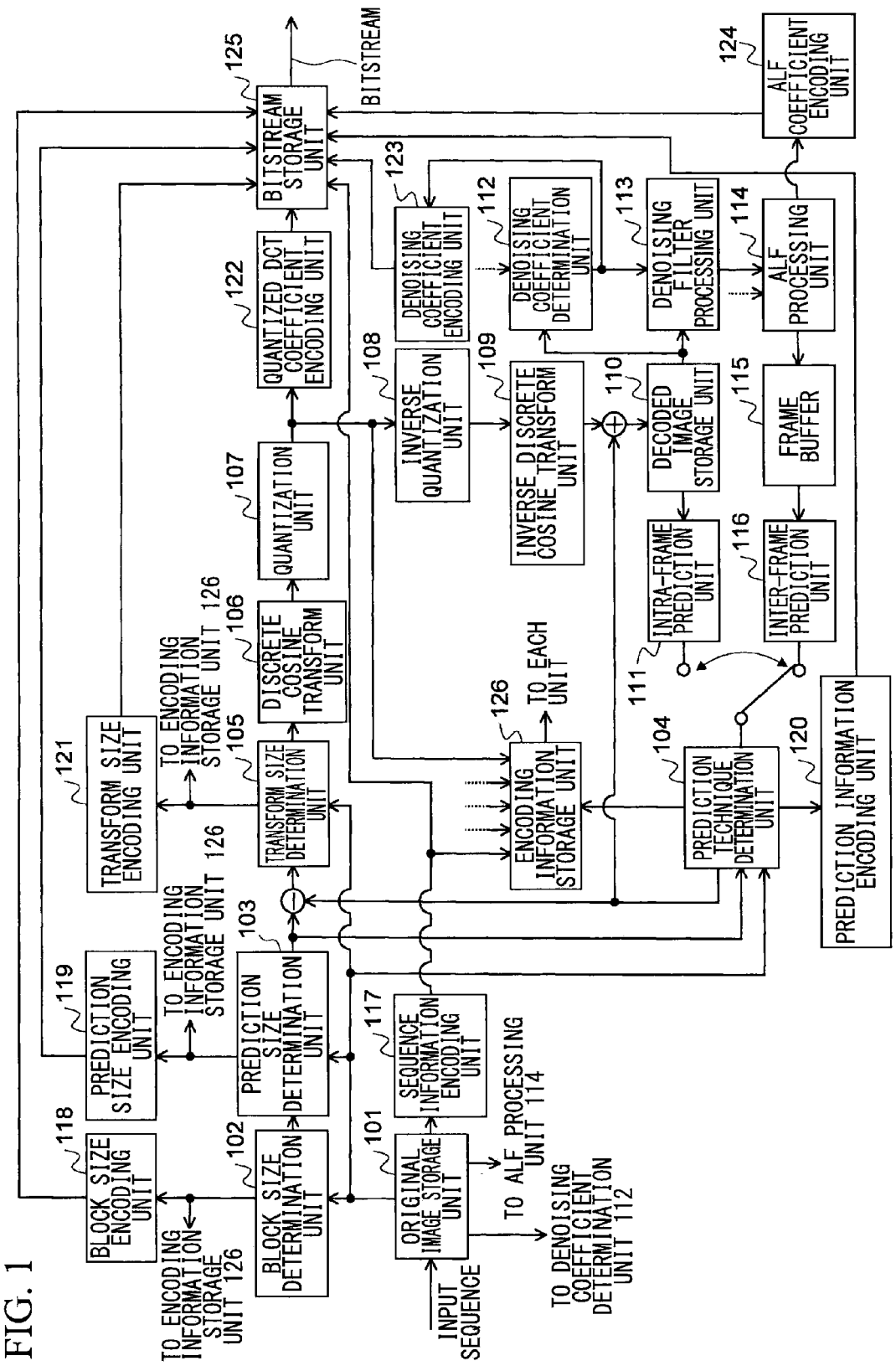
FIG. 1 is a diagram illustrating an example of a configuration of a video encoding apparatus to which an embodiment of the present invention is applied.

FIG. 1 is a diagram illustrating an example of a configuration of a video encoding apparatus to which an embodiment of the present invention is applied. In the video encoding apparatus shown in FIG. 1, an original image storage unit 101 is a storage unit for all the images of an input sequence, which is an encoding target, and sequentially outputs encoding target images of frames.

In the video encoding apparatus of FIG. 1, an example in which a denoising filter processing unit 113 retains both a reference search shape and a reference template shape as fixed values is illustrated. Moreover, an example in which as the denoising coefficient, a denoising coefficient that provides the optimum coding efficiency compared to that of an original image is determined, which is encoded in a bitstream as a denoising-coefficient overhead is illustrated. When one or both of a search shape and a template shape is supplied from the outside through, for example, the user's setting, it is necessary to transmit these shapes to a decoding apparatus, but the setting from the outside can be realized by encoding these shapes as an overhead similar to the denoising coefficient, and thus a description thereof is omitted in the example of application to the present encoding apparatus and in an example of application to a decoding apparatus.

A block size determination unit 102 determines a block size, with which a predetermined CodingUnit is divided and encoding is executed, and outputs a target block and the block size. A prediction size determination unit 103 determines a block prediction size, with which pixel values of the target block are predicted, and outputs a target block and the prediction size. A prediction technique determination unit 104 determines a technique that provides the highest coding efficiency among techniques including intra-frame prediction and inter-frame prediction when the pixel values of the target block are predicted, and outputs a prediction block and prediction information when that technique is used. The difference between the target block output by the prediction size determination unit 103 and the prediction block is calculated to generate a difference block.

A transform size determination unit 105 determines a transform size, with which the difference block is divided, and outputs divided difference blocks having the transform size as well as the transform size. A discrete cosine transform unit 106 applies a discrete cosine transform (DCT) to the difference blocks and outputs DCT coefficients. A quantization unit 107 quantizes the DCT coefficients and outputs quantized DCT coefficients.

An inverse quantization unit 108 performs inverse quantization on the quantized DCT coefficients to restore the DCT coefficients. An inverse discrete cosine transform unit 109 applies an inverse discrete cosine transform to the DCT coefficients and outputs a decoded difference block. The decoded difference block is added to the prediction block to generate a partial decoded image. A decoded image storage unit 110 is a storage unit for storing the partial decoded image and images that can also be referred to in the decoding apparatus. An intra-frame prediction unit 111 refers to the partial decoded image stored in the decoded image storage unit 110 and outputs a prediction block and prediction information.

A denoising coefficient determination unit 112 determines a denoising coefficient that provides the optimum coding efficiency with reference to a decoded image and the original image, and outputs the denoising coefficient.

The denoising filter processing unit 113 is a filter which removes noise of the decoded image using an image processing method which performs template matching between a template which is a comparison source for a denoising target pixel in the decoded image and a template for each of search points which are search targets with reference to the decoded image as a denoising target image, and removes noise of the target pixel using weights in accordance with the degree of similarity between the templates and the weighted sum of pixel values at the search points. This filter process generates a filtered decoded image in which coding distortion has been reduced. This denoising filter processing unit 113 is particularly different from conventional arts. A detailed embodiment thereof will be described below.

An adaptive loop filter (ALF) processing unit 114 performs a filter process on the filtered decoded image so as to be close to the original image, and outputs an ALF-ed decoded image and ALF coefficients. A frame buffer 115 is a storage unit for storing the ALF-ed decoded image. An inter-frame prediction unit 116 refers to the frame buffer 115 and outputs a prediction block and prediction information.

A sequence information encoding unit 117 encodes information unique to the input sequence, such as the numbers of pixels in the vertical direction and the horizontal direction of video, and then outputs a sequence-information overhead to a bitstream storage unit 125. A block size encoding unit 118 receives the block size from the block size determination unit 102, performs encoding, and then outputs a block-size overhead. A prediction size encoding unit 119 receives the prediction size from the prediction size determination unit 103, performs encoding, and then outputs a prediction-size overhead. A prediction information encoding unit 120 receives the prediction information from the prediction technique determination unit 104, performs encoding, and then outputs a prediction-information overhead.

A transform size encoding unit 121 receives the transform size from the transform size determination unit 105, performs encoding, and then outputs a transform-size overhead. A quantized DCT coefficient encoding unit 122 receives the quantized DCT coefficients from the quantization unit 107, performs encoding, and then outputs a DCT overhead. A denoising coefficient encoding unit 123 receives the denoising coefficient determined by the denoising coefficient determination unit 112, performs encoding, and then outputs a denoising-coefficient overhead. An ALF coefficient encoding unit 124 receives the ALF coefficients, performs encoding, and then outputs an ALF overhead. The bitstream storage unit 125 is a storage unit for storing each overhead, and outputs a bitstream as an encoding result upon completion of encoding of the entire sequence.

An encoding information storage unit 126 is a storage unit for storing encoding information which can also be referred to in the decoding apparatus. This encoding information stored in the encoding information storage unit 126 is referred to and used by the denoising filter processing unit 113 and other units.

[Processing Flow of Video Encoding Apparatus]

Figure 2:
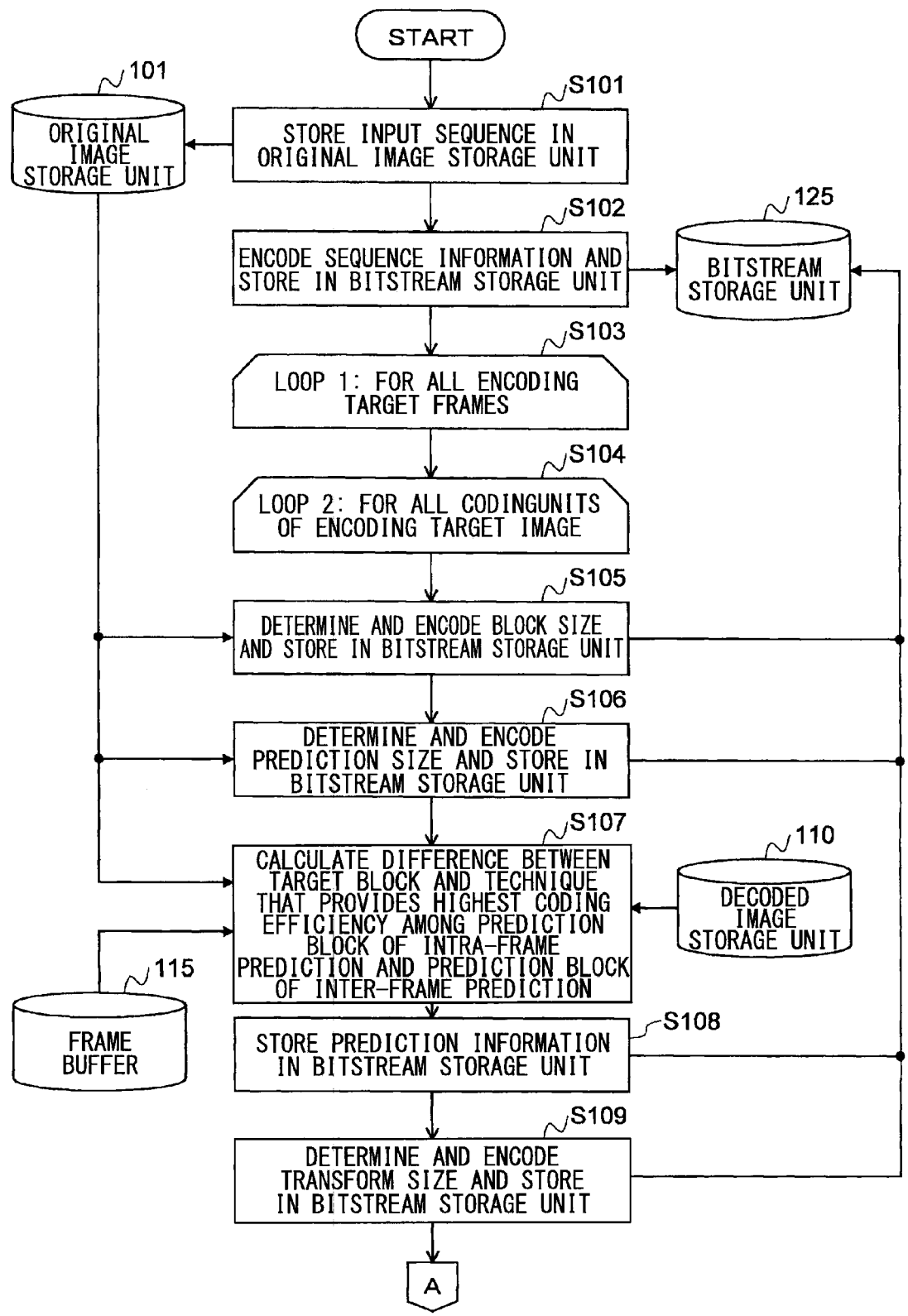
FIG. 2 is a flowchart of the processing of the video encoding apparatus.
Figure 3:
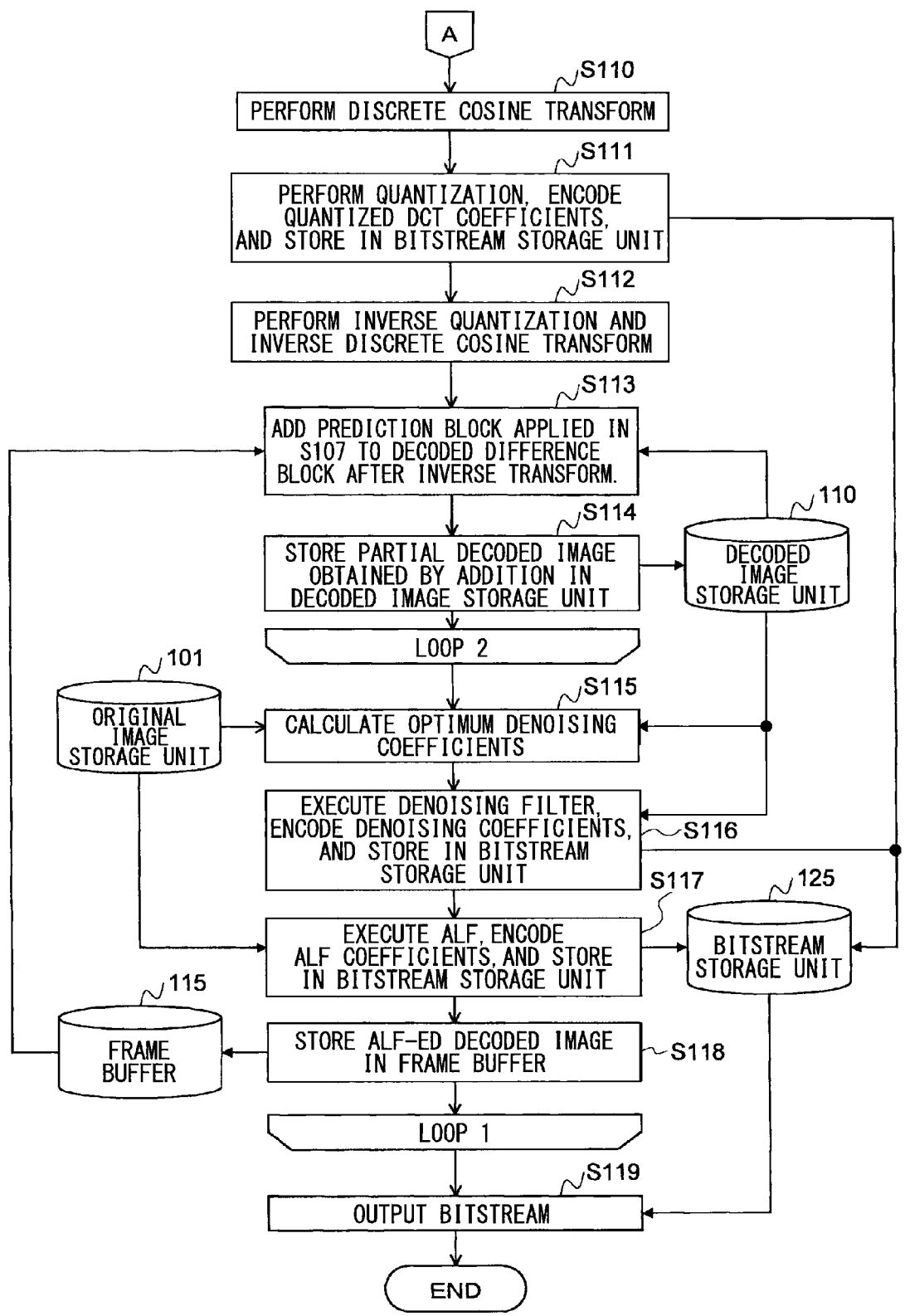
FIG. 3 is a flowchart of the processing of the video encoding apparatus.

FIG. 2 and FIG. 3 illustrate a flowchart of the processing of the video encoding apparatus shown in FIG. 1. The video encoding apparatus performs the following processes.

First, in step S101, an input sequence is stored in the original image storage unit 101.

Next, in step S102, sequence information is encoded and stored in the bitstream storage unit 125.

Next, in step 103, a loop process up to step S118 is performed on all the encoding target frames.

Next, in step S104, a loop process up to step S114 is performed on all CodingUnits (CUs) of an encoding target image.

Next, in step S105, a block size is determined, encoded, and stored in the bitstream storage unit 125.

Next, in step S106, a prediction size is determined, encoded, and stored in the bitstream storage unit 125.

Next, in step S107, the difference between a target block and a technique that provides the highest coding efficiency among a prediction block of intra-frame prediction and a prediction block of inter-frame prediction is calculated.

Next, in step S108, prediction information is stored in the bitstream storage unit 125.

Next, in step S109, a transform size is determined, encoded, and stored in the bitstream storage unit 125.

Next, in step S110, a discrete cosine transform (DCT) is performed.

Next, in step S111, quantization is performed, and quantized DCT coefficients are encoded and stored in the bitstream storage unit 125.

Next, in step S112, inverse quantization and an inverse discrete cosine transform are performed.

Next, in step S113, the prediction block applied in step S107 is added to a decoded difference block after the inverse transform.

Next, in step S114, a partial decoded image obtained by the addition is stored in the decoded image storage unit 110.

Upon completion of the loop process for all CUs of the encoding target image, in step S115, a denoising coefficient that provides the optimum coding efficiency is calculated using the decoded image and the original image.

Next, in step S116, a denoising filter process using the present technique is executed on the decoded image using the calculated denoising coefficient, and the denoising coefficient is encoded and stored in the bitstream storage unit 125.

Next, in step S117, an adaptive loop filter (ALF) is executed, and ALF coefficients are encoded and stored in the bitstream storage unit 125.

Next, in step S118, an ALF-ed decoded image is stored in the frame buffer 115.

Upon completion of the loop process for all the encoding target frames, in step S119, a bitstream is output, and the processing is completed.

Example of Application to Video Decoding Apparatus

Figure 4:
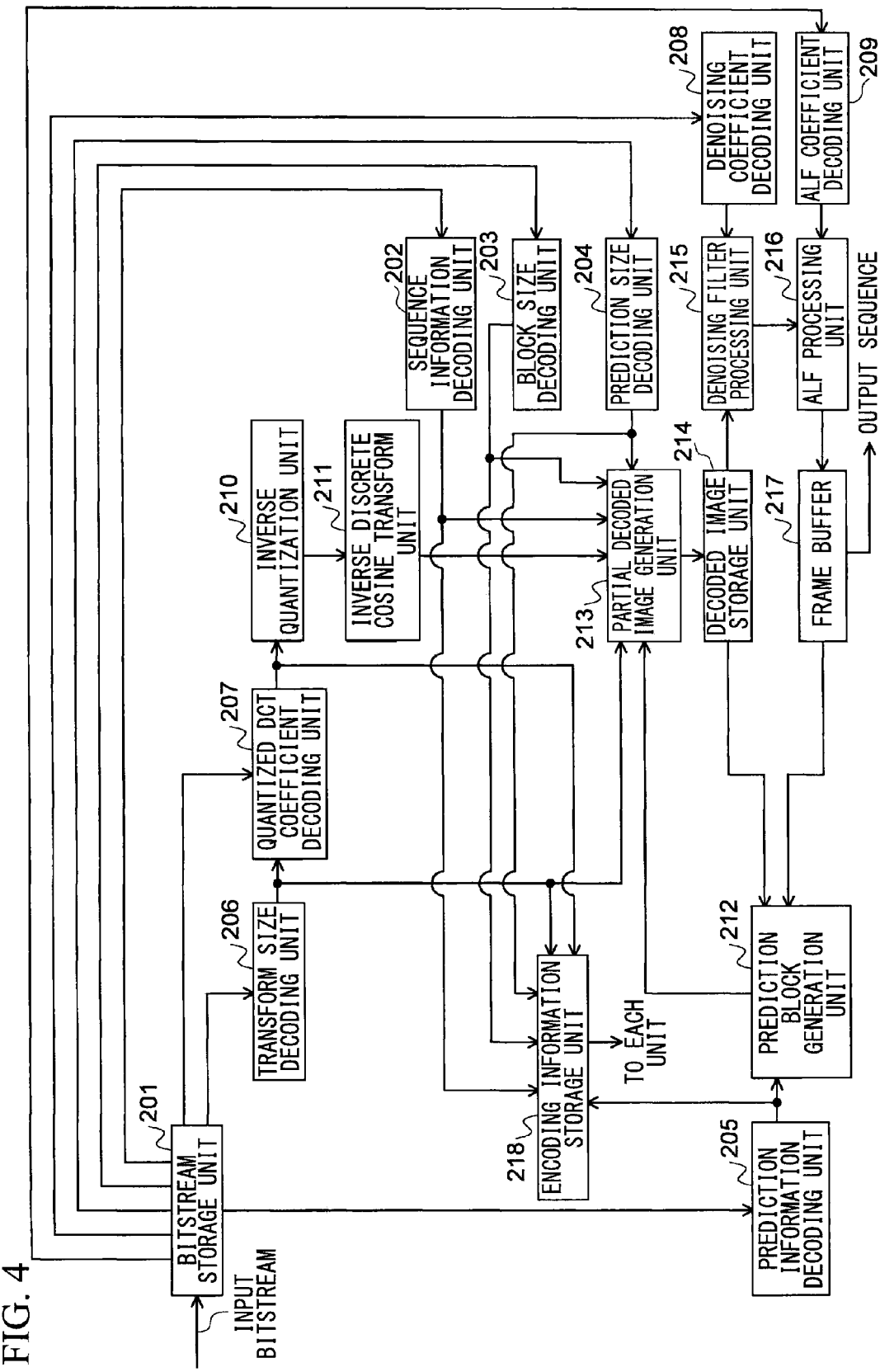
FIG. 4 is a diagram illustrating an example of a configuration of a video decoding apparatus to which an embodiment of the present invention is applied.

FIG. 4 is a diagram illustrating an example of a configuration of a video decoding apparatus to which an embodiment of the present invention is applied. Hereinafter, the video decoding apparatus shown in FIG. 4 will be described. A bitstream storage unit 201 is a storage unit for an input bitstream, and outputs each piece of overhead information as need arises. A sequence information decoding unit 202 receives the sequence-information overhead, and decodes information unique to a sequence, such as the numbers of pixels in the vertical direction and the horizontal direction of video.

A block size decoding unit 203 receives the block-size overhead, and decodes information indicating a block size, with which a predetermined CodingUnit is divided and encoded. A prediction size decoding unit 204 receives the prediction-size overhead, and outputs a prediction size applied in the video encoding apparatus.

A prediction information decoding unit 205 receives the prediction-information overhead and outputs prediction information. A transform size decoding unit 206 receives the transform-size overhead and outputs a transform size applied in the video encoding apparatus. A quantized DCT coefficient decoding unit 207 receives the transform size and the DCT overhead and outputs quantized DCT coefficients. A denoising coefficient decoding unit 208 receives the denoising-coefficient overhead and outputs a denoising coefficient. An ALF coefficient decoding unit 209 receives the ALF overhead and outputs ALF coefficients.

An inverse quantization unit 210 performs inverse quantization on the quantized DCT coefficients to restore the DCT coefficient. An inverse discrete cosine transform unit 211 applies an inverse discrete cosine transform to the DCT coefficients and outputs a decoded difference signal. A prediction block generation unit 212 receives the prediction information, a partial decoded image, and a reference frame, and generates a prediction block. A partial decoded image generation unit 213 adds the prediction block to the decoded difference signal to generate the partial decoded image. A decoded image storage unit 214 is a storage unit for storing the partial decoded image.

A denoising filter processing unit 215 is a filter which removes noise of a decoded image using an image processing method which performs template matching between a template which is a comparison source for a denoising target pixel in the decoded image and a template for each of search points which are search targets with reference to the decoded image as a denoising target image, and removes noise of the target pixel using weights in accordance with the degree of similarity between the templates and the weighted sum of pixel values at the search points, and this filter process generates a filtered decoded image in which distortion at block boundaries has been reduced. This denoising filter processing unit 215 is particularly different from conventional arts. A detailed embodiment thereof will be described below.

An ALF processing unit 216 receives the ALF coefficients, performs a filter process on the filtered decoded image so as to be close to the original image, and outputs an ALF-ed decoded image. It is to be noted that this ALF-ed decoded image becomes a final decoded image in the decoding. A frame buffer 217 is a storage unit for storing the ALF-ed decoded image. An encoding information storage unit 218 is a storage unit for storing encoding information, and this encoding information stored in the encoding information storage unit 218 is referred to and used by the denoising filter processing unit 215 and other units.

[Processing Flow of Video Decoding Apparatus]

Figure 5:
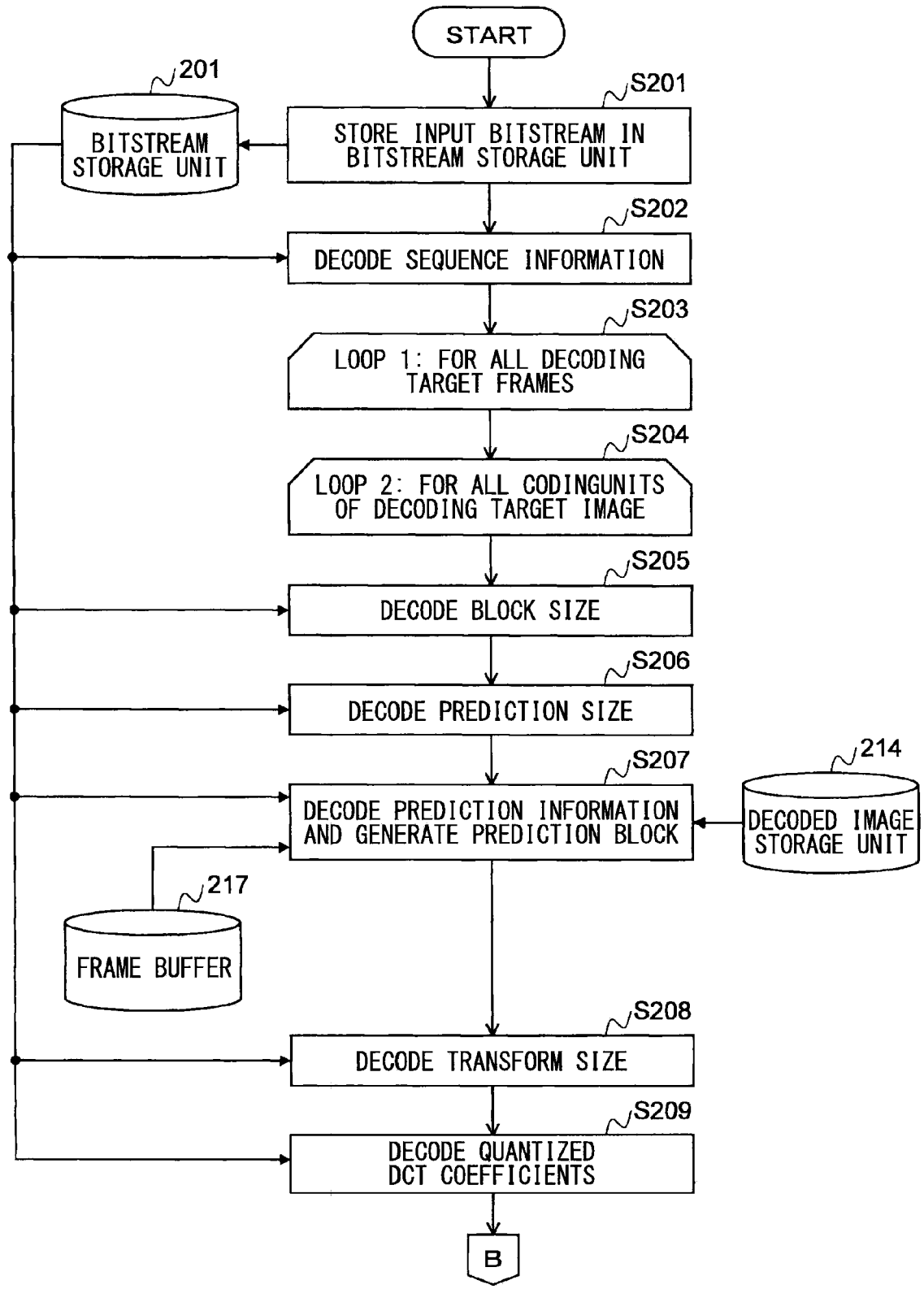
FIG. 5 is a flowchart of the processing of the video decoding apparatus.
Figure 6:
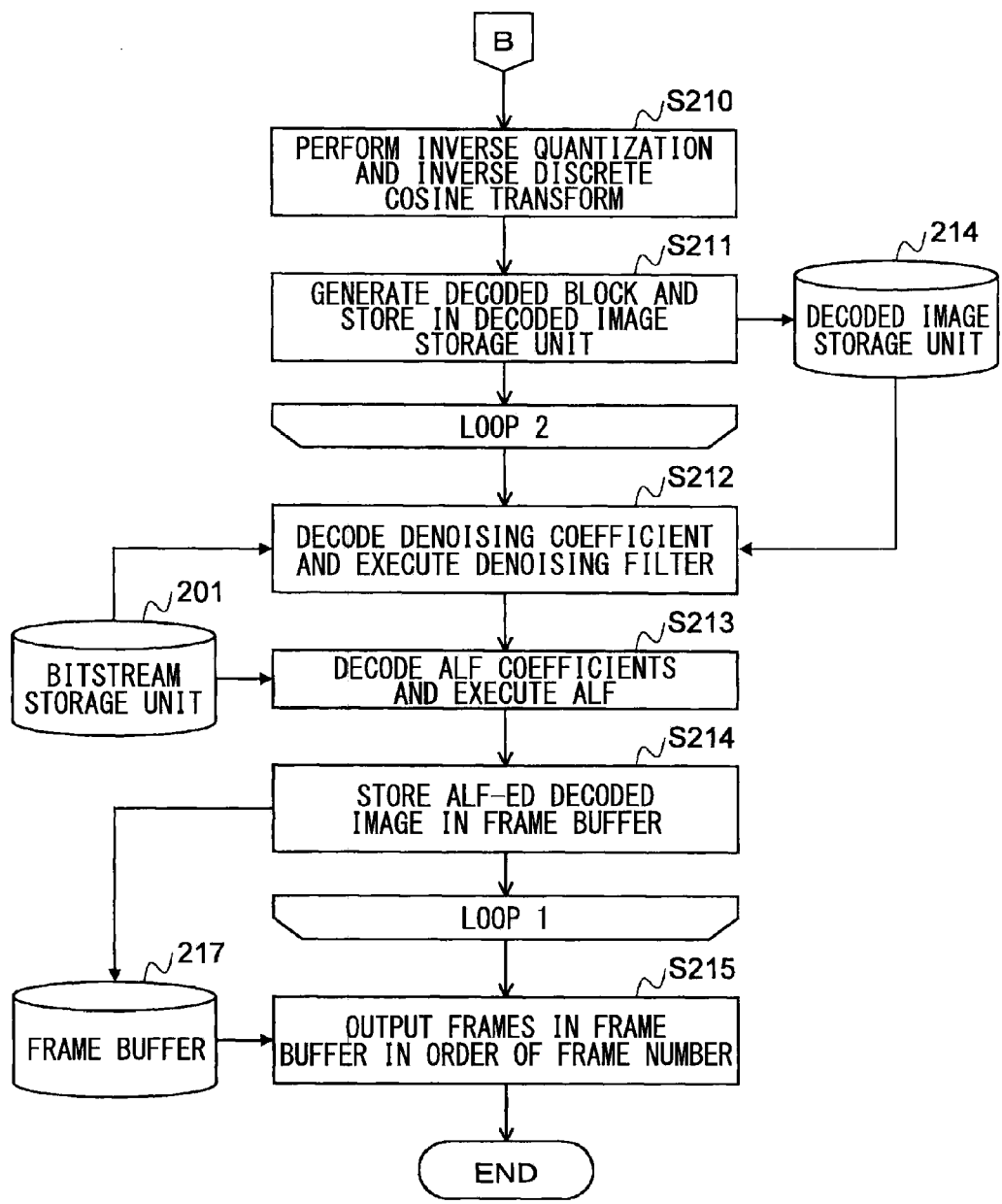
FIG. 6 is a flowchart of the processing of the video decoding apparatus.

FIG. 5 and FIG. 6 illustrate a flowchart of the processing of the video decoding apparatus shown in FIG. 4. The video decoding apparatus performs the following processes.

First, in step S201, an input bitstream is stored in the bitstream storage unit 201.

Next, in step S202, sequence information is decoded.

Next, in step S203, a loop process up to step S214 is performed on all the decoding target frames.

Next, in step S204, a loop process up to step S211 is performed on all CodingUnits (CUs) of a decoding target image.

Next, in step S205, a block size is decoded.

Next, in step S206, a prediction size is decoded.

Next, in step S207, prediction information is decoded and a prediction block is generated.

Next, in step S208, a transform size is decoded.

Next, in step S209, quantized DCT coefficients are decoded.

Next, in step S210, inverse quantization and an inverse discrete cosine transform are performed.

Next, in step S211, a decoded block is generated using the prediction block of step S207 and the result of step S210 and is stored in the decoded image storage unit 214.

Upon completion of the loop process for all CUs of the decoding target image, in step S212, a denoising coefficient is decoded, and a denoising filter process using the present technique is executed on a partial decoded image.

Next, in step S213, ALF coefficients are decoded and an ALF process is executed.

Next, in step S214, an ALF-ed decoded image is stored in the frame buffer 217.

Upon completion of the loop process for all the decoding target frames, in step S215, frames of the frame buffer 217 are output in the order of frame number to generate an output sequence, and the processing is completed.

Example 1 of Denoising Filter Processing Unit

Figure 7:
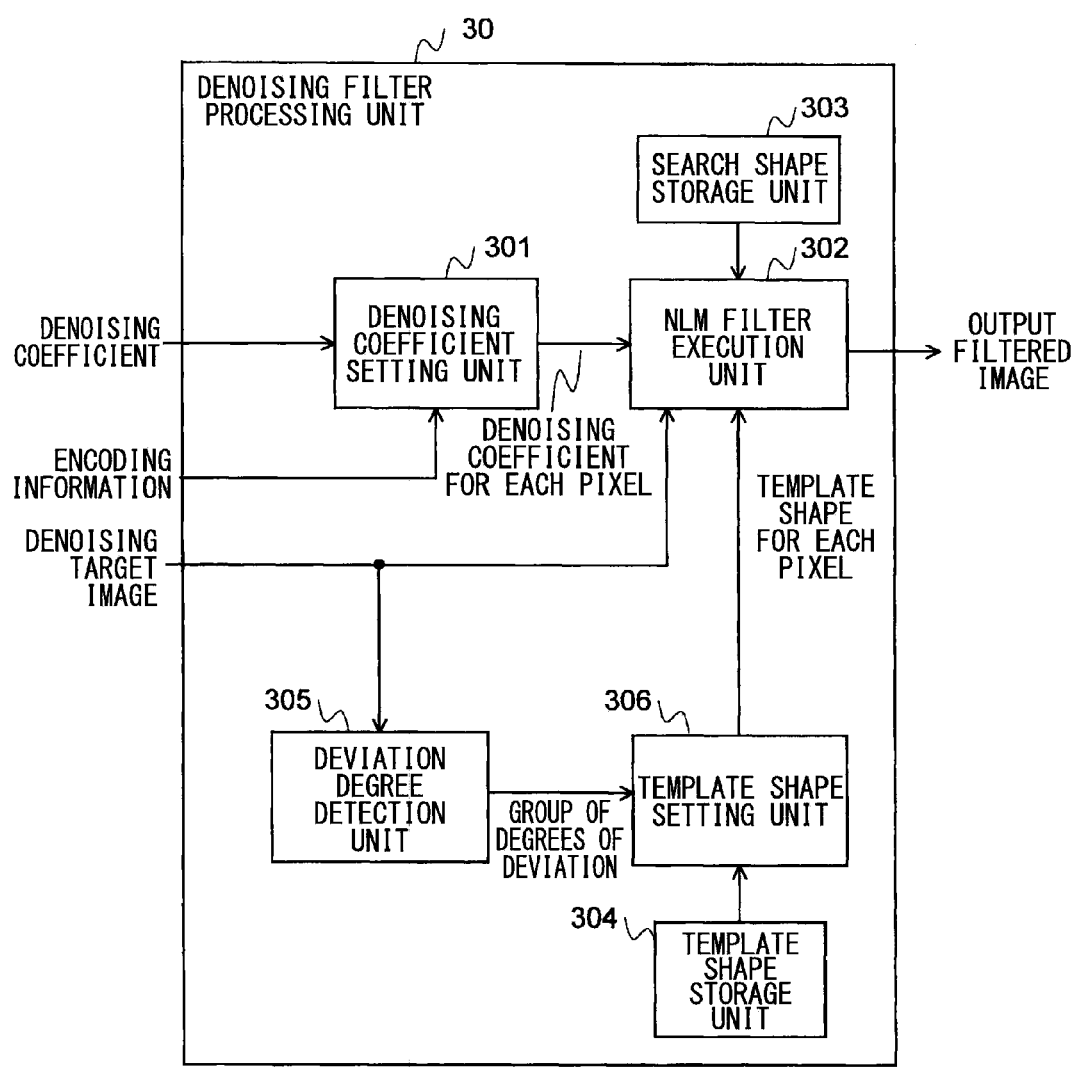
FIG. 7 is a diagram illustrating a first example of a configuration of a denoising filter processing unit.

FIG. 7 is a diagram illustrating a first example of a configuration of the denoising filter processing unit. A denoising filter processing unit 30 shown in FIG. 7 is a loop filter which is used as the above-described denoising filter processing unit 113 in the video encoding apparatus shown in FIG. 1. In addition, the denoising filter processing unit 30 is also used as the above-described denoising filter processing unit 215 in the video decoding apparatus shown in FIG. 4.

The denoising filter processing unit 30 is provided with a denoising coefficient setting unit 301, an NLM filter execution unit 302, a search shape storage unit 303, a template shape storage unit 304, a deviation degree detection unit 305, and a template shape setting unit 306.

The denoising coefficient setting unit 301 generates denoising coefficients which correspond to pixel positions of a denoising target image using a predetermined reference denoising coefficient and encoding information. In general, in a medium rate to a low rate, block noise begins to be noticeable at unit boundaries of a prediction processing unit PredictionUnit and a transform processing unit TransformUnit, and thus denoising coefficients at pixel positions in the vicinity of these boundaries are set so as to be higher than those inside a block, using the encoding information.

The search shape storage unit 303 and the template shape storage unit 304 are storage units for storing each shape as a fixed value. The deviation degree detection unit 305 and the template shape setting unit 306 are provided for the purpose of introducing a process of limiting a template shape on a pixel-by-pixel basis. In conventional NLM filters, a template shape is generally given as a fixed value for the entire frame. In contrast, in the present embodiment, as pre-processing of an NLM filter by the NLM filter execution unit 302, the deviation degree detection unit 305 detects the degrees of deviation from surrounding pixels for each of pixels of a decoded image, which is the denoising target image, and the template shape setting unit 306 classifies the degrees of deviation detected by the deviation degree detection unit 305 into multiple levels and sets the template shape (large to small) of each of the pixels in accordance with the degree of deviation (high to low).

The NLM filter execution unit 302 inputs the denoising target image, the denoising coefficients for the pixels set by the denoising coefficient setting unit 301, the template shape for each pixel set by the template shape setting unit 306, and the search shape given from the search shape storage unit 303 and outputs a denoised image. The processing performed by the NLM filter execution unit 302 is similar to that of a conventional NLM filter disclosed in Non-Patent Document 1.

As the reference denoising coefficient, the reference search shape, and the reference template shape, information set by a user may be input to the video encoding apparatus or the video decoding apparatus, or fixed values may be stored in advance and the values may be used.

The present embodiment illustrates an example which inputs a denoising coefficient and stores a search shape and a template shape in the storage units 303 and 304 in advance as fixed values. When the search shape and the template shape are arbitrarily set by a user, the video encoding apparatus encodes these pieces of information similar to the denoising coefficient, and the video decoding apparatus decodes these pieces of information, thereby realizing the user's setting.

Figure 8:
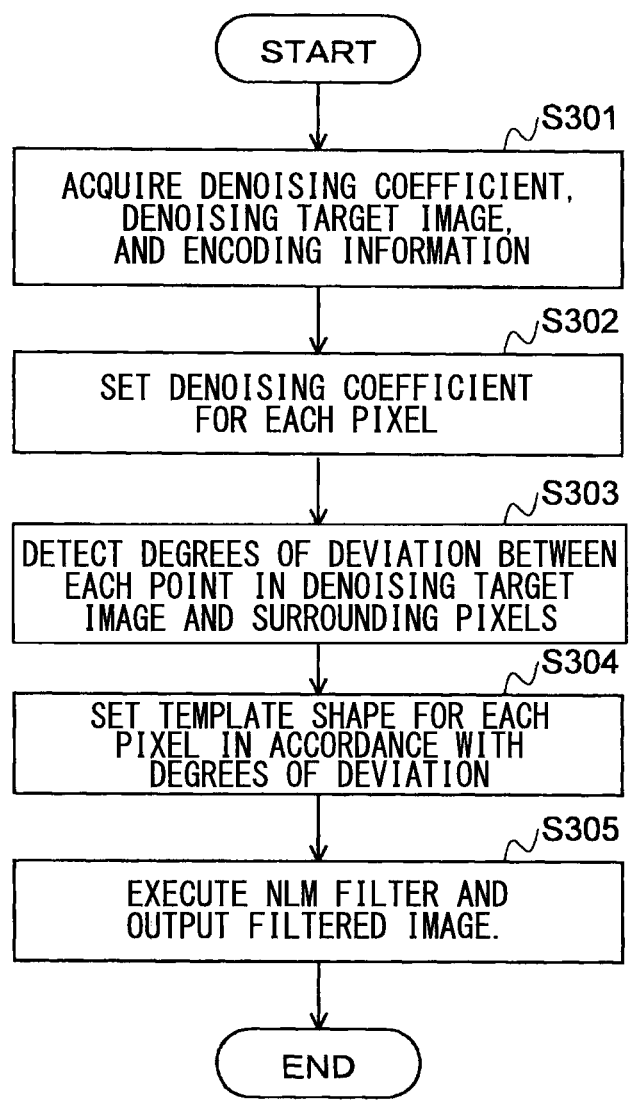
FIG. 8 is a flowchart of the processing of the denoising filter processing unit.

FIG. 8 is a flowchart of the processing of the denoising filter processing unit 30 shown in FIG. 7. First, in step S301, the denoising filter processing unit 30 acquires a denoising coefficient, a denoising target image, and encoding information that are input from the outside. The denoising target image is input from the decoded image storage unit 110 (in a case of encoding) or the decoded image storage unit 214 (in a case of decoding), and the encoding information is input from the encoding information storage unit 126 (in a case of encoding) or the encoding information storage unit 218 (in a case of decoding).

In step S302, the denoising coefficient setting unit 301 sets denoising coefficients which correspond to pixel positions of the denoising target image from the input reference denoising coefficient and the input encoding information.

Next, in step S303, the deviation degree detection unit 305 inputs the denoising target image, calculates the degrees of deviation between a target pixel and surrounding pixels, and outputs a group of degrees of deviation which corresponds to each pixel. In step S304, the template shape setting unit 306 sets and outputs a limited template shape which corresponds to each pixel using the group of degrees of deviation and a predetermined template shape stored in the template shape storage unit 304. When the template shape is limited, the input template shape is treated as the maximum shape, and a limitation is applied so that the lower the degree of deviation is, the smaller the template shape is.

Finally, in step S305, the NLM filter execution unit 302 executes an NLM filter in accordance with the set information and outputs a resultant filtered image.

Figure 9:
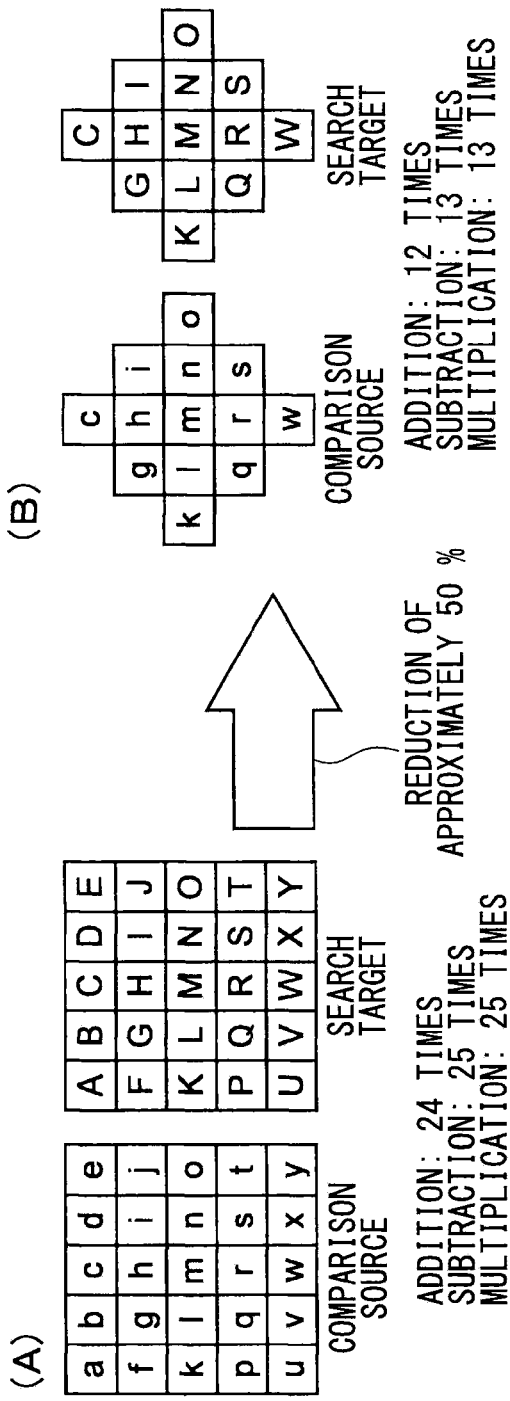
FIG. 9 is a diagram describing an example of limiting a template shape by a template shape setting unit.

FIG. 9 is a diagram describing an example of limiting a template shape by the template shape setting unit 306. For example, it is assumed that an input or set template shape is a 5×5 block as shown in FIG. 9 (A). This template shape is limited in accordance with the degrees of deviation, as shown, for example, in FIG. 9 (B). When SSD is used as the degree of similarity between templates, operations including 24 additions, 25 subtractions, and 25 multiplications are required for the original template shape; in contrast, by limiting the template shape as shown in FIG. 9 (B), only operations including 12 additions, 13 subtractions, and 13 multiplications are required, and thus the computational complexity is reduced by approximately 50%.

The processing by the denoising filter processing unit 30 aims at removal of noise due to coding, and it does not assume removal of noise that is uniformly applied to the entirety of a frame from the frame like general image processing. Noise due to coding (coding distortion) can be roughly classified into the following types.
1. Disappearance of a pattern due to smoothing
2. Mosquito noise around an edge due to DCT
3. Block noise generated at unit boundaries of PredictionUnit and TransformUnit Of these, the present embodiment does not aim at restoring a pattern lost by smoothing because it is very difficult to do so. If an NLM filter is applied to such a smoothed region, in which there is no change in pixel value, the computational complexity therefor is required despite there is almost no change between a pixel signal before the calculation and a pixel signal after the calculation. The present embodiment calculates the degrees of deviation from surrounding pixels to reduce the computational complexity that is also allocated to such a smoothed region.

Example 2 of Denoising Filter Processing Unit

Figure 10:
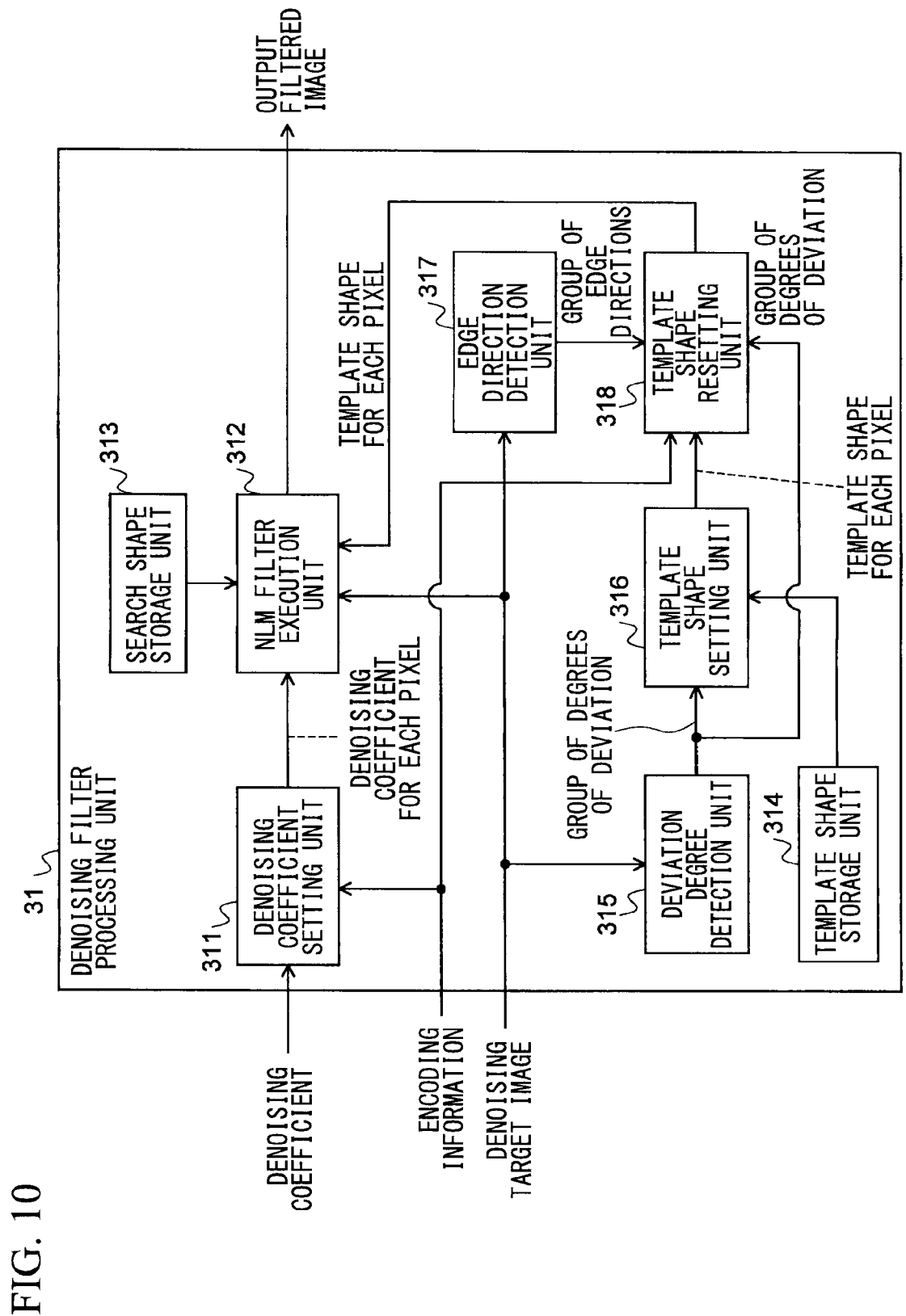
FIG. 10 is a diagram illustrating a second example of the configuration of the denoising filter processing unit.

FIG. 10 is a diagram illustrating a second example of the configuration of the denoising filter processing unit. A denoising filter processing unit 31 shown in FIG. 10 is a loop filter used as the above-described denoising filter processing unit 113 in the video encoding apparatus shown in FIG. 1. Moreover, the denoising filter processing unit 31 is also used as the above-described denoising filter processing unit 215 in the video decoding apparatus shown in FIG. 4.

The denoising filter processing unit 31 is provided with a denoising coefficient setting unit 311, an NLM filter execution unit 312, a search shape storage unit 313, a template shape storage unit 314, a deviation degree detection unit 315, a template shape setting unit 316, an edge direction detection unit 317, and a template shape resetting unit 318.

This denoising filter processing unit 31 is different from the above-described denoising filter processing unit 30 shown in FIG. 7 in that the edge direction detection unit 317 and the template shape resetting unit 318 are provided. The other units have the same functions as those of the denoising filter processing unit 30.

The edge direction detection unit 317 detects edge directions of a denoising target image, and outputs a group of edge directions corresponding to pixels in the denoising target image. As an example of the edge directions, there is a group of numbers or a group of angles that are numbered in accordance with the directions.

The template shape resetting unit 318 performs resetting for further limiting a template shape that has been excessively allocated by the template shape setting unit 316 with reference to a group of edge directions detected by the edge direction detection unit 317, a group of degrees of deviation detected by the deviation degree detection unit 315, and encoding information. Specifically, a template shape that is prone to be excessively allocated to the surroundings of block noise, which is prone to be generated at unit boundaries of PredictionUnit and TransformUnit, is further limited.

Figure 11:
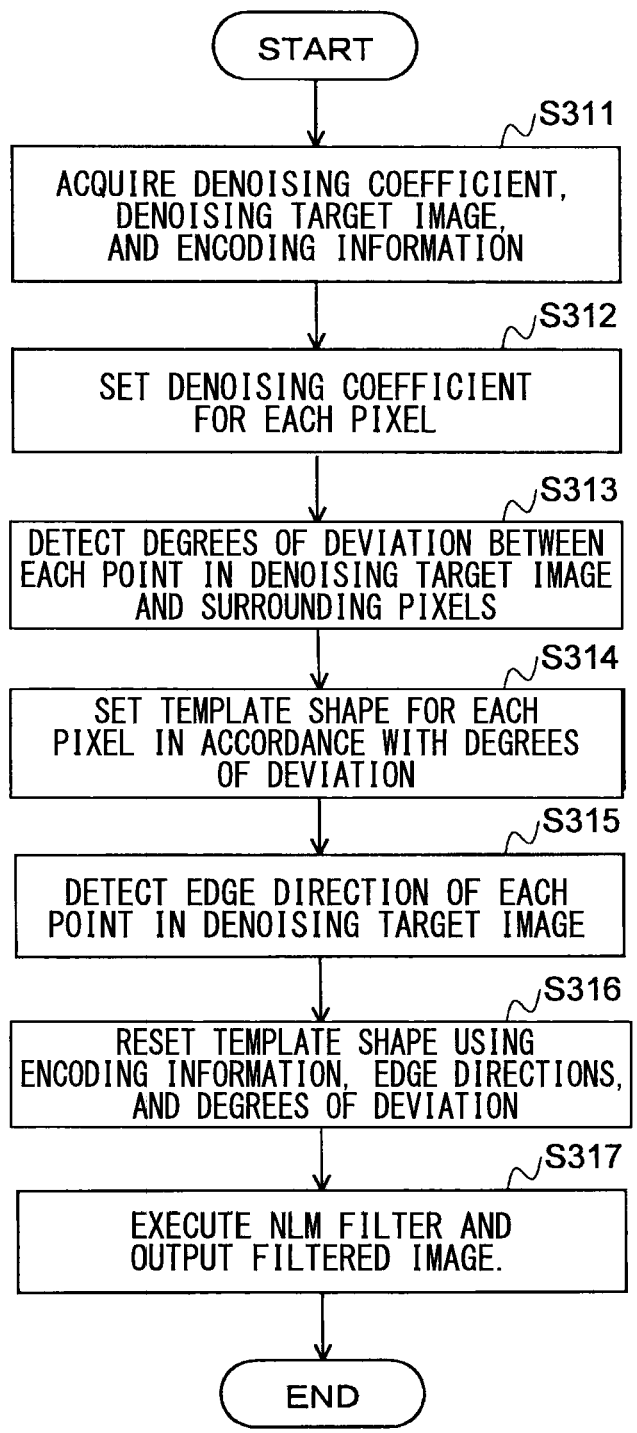
FIG. 11 is a flowchart of the processing of the denoising filter processing unit.

FIG. 11 is a flowchart of the processing of the denoising filter processing unit 31 shown in FIG. 10. First, in step S311, the denoising filter processing unit 31 acquires a denoising coefficient, a denoising target image, and encoding information that are input from the outside.

In step S312, the denoising coefficient setting unit 311 sets denoising coefficients that correspond to pixel positions of the denoising target image from the input reference denoising coefficient and the input encoding information. Next, in step S313, the deviation degree detection unit 315 inputs the denoising target image, calculates the degrees of deviation between a target pixel and surrounding pixels, and outputs a group of degrees of deviation which corresponds to each pixel. In step S314, the template shape setting unit 316 sets and outputs a limited template shape which corresponds to each pixel using the group of degrees of deviation and a predetermined template shape stored in the template shape storage unit 314. When the template shape is limited, the input template shape is treated as the maximum shape, and a limitation is applied so that the lower the degree of deviation is, the smaller the template shape is. The above processes of step S311 to S314 are the same as those of the denoising filter processing unit 30 described with reference to FIG. 8.

In step S315, the edge direction detection unit 317 detects an edge direction of each point in the denoising target image and outputs a group of edge directions. In step S316, the template shape resetting unit 318 resets the template shape using the encoding information, the group of edge directions detected by the edge direction detection unit 317, and the group of degrees of deviation detected by the deviation degree detection unit 315, to reduce an excessive allocation of the template shape set in step S314. Finally, in step S317, the NLM filter execution unit 312 executes an NLM filter in accordance with the set information and outputs a resultant filtered image.

Example of Deviation Degree Detection Method

Figures 12A, 12B:
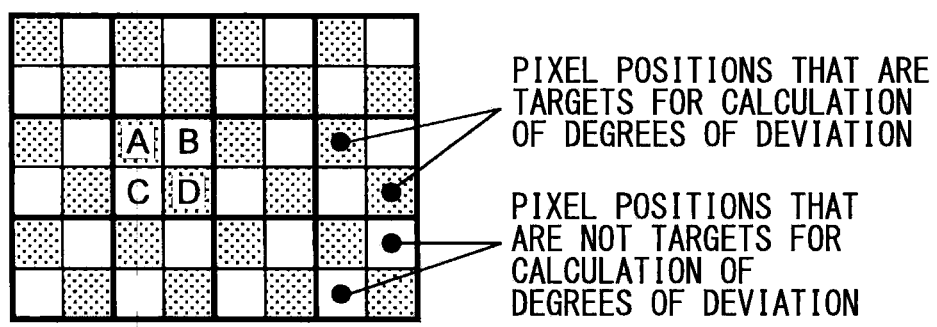
FIG. 12A is a diagram describing an example of a deviation degree detection method.
FIG. 12B is a diagram describing the example of the deviation degree detection method.

An example of the deviation degree detection methods in the deviation degree detection units 305 and 315 will be described. FIG. 12A to FIG. 12B are diagrams describing the example of the deviation degree detection methods. A description will be given for a case in which a pixel z shown in FIG. 12A is set as a denoising target pixel and numbers a to x are assigned to its surrounding pixels. Here, the weighted sum obtained by multiplying the absolute differences between the pixel z and the surrounding pixels (a to x) by coefficients that take attenuation depending on distance into consideration is used as an index for the degree of deviation (DiffIntensity). That is, DiffIntensity is calculated by the following equation.

$$DiffIntensity = \\ A(|h-z|+|l-z|+|m-z|+|q-z|) + B(|g-z|+|i-z|+|p-z|+|r-z|) + \\ C(|c-z|+|k-z|+|n-z|+|v-z|) + \\ D(|b-z|+|d-z|+|f-z|+|j-z|+|o-z|+|s-z|+|u-z|+|w-z|) + \\ E(|a-z|+|e-z|+|t-z|+|x-z|)$$

A to E in the equation are coefficients determined in advance in accordance with the distances between the target pixel and the surrounding pixels, and they are set arbitrarily. For example, a Gaussian distribution depending on distance and so on can be applied to the setting of these coefficients A to E. It is to be noted that not all of A to E are necessarily targets, and it is possible to reduce the computational complexity of the filter by, for example, setting D to 0.

Upon completion of calculation of all DiffIntensities, the deviation degree detection units 305 and 315 output a group of degrees of deviation to the subordinate template shape setting units 306 and 316.

Alternatively, it is contemplated that the absolute value of a Laplacean filter, a sum of squared difference (SSD), a variance, and so on can be applied to the calculation of the degrees of deviation.

In order to further reduce the computational complexity, a technique of setting several sampling points as calculation targets for each N×N block having an arbitrary size for a decoded image and using the degrees of deviation as typical values at pixel positions thereof is also contemplated.

FIG. 12B illustrates an example of thinning out the number of samples. In this example, a block is divided into 2×2, and the upper left pixel and the lower right pixel are calculation targets. When the degree of deviation in this example is denoted as DiffIntensity$_{2\times2}$, DiffIntensity$_{2\times2}$ is calculated by the following equation.

$$DiffIntensity_{2\times2} = (DiffIntensity \text{ at pixel position of } A + DiffIntensity \text{ at pixel position of } D)/2$$

The above DiffIntensity$_{2\times2}$ is used as a typical value when reference to the degrees of deviation at the pixel positions of A to D is requested. In this example, the computational complexity required for calculating the degrees of deviation is reduced to approximately half.

Example 1 of Template Shape Setting Method

As one of examples of the template shape setting methods in the template shape setting units 306 and 316, an example of a reduction in template shape for all the points of a reference template shape of a 3×3 block that is given from an apparatus using a group of degrees of deviation calculated by the deviation degree detection units 305 and 315 will be given.

Figure 13:
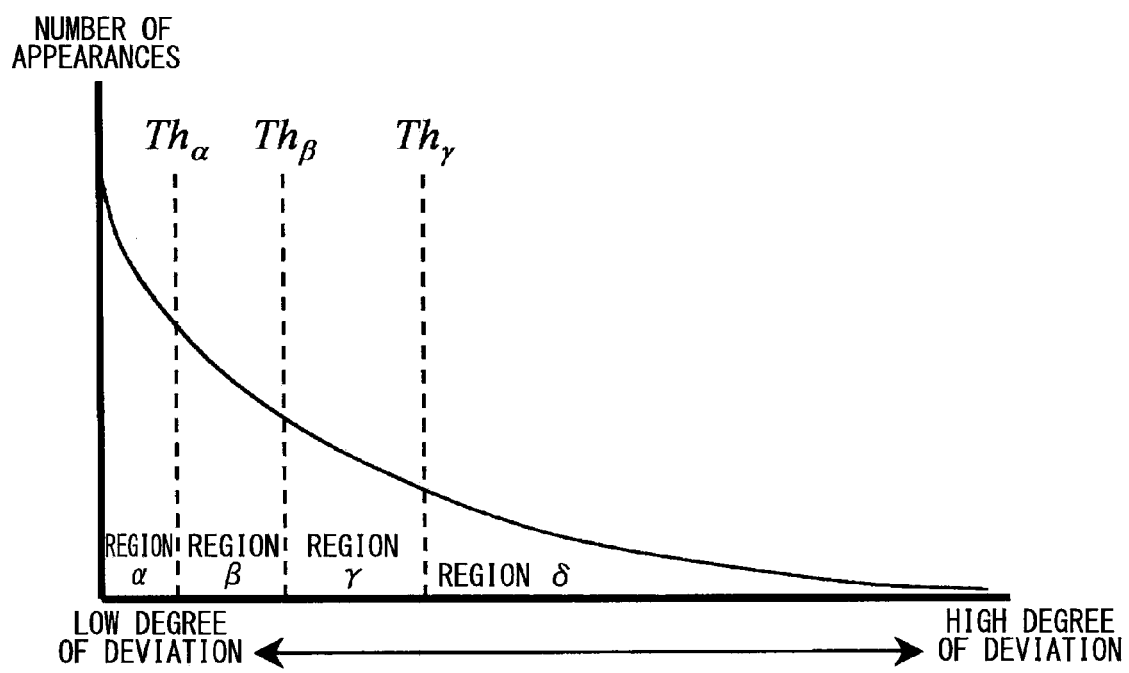
FIG. 13 is a diagram illustrating a histogram of degrees of deviation as well as the relationship between thresholds and the setting of regions.

FIG. 13 is a diagram illustrating a histogram of degrees of deviation as well as the relationship between thresholds and the setting of regions. When the target is a natural image, the histogram of the group of degrees of deviation is skewed to a lower value, and the higher the degree of deviation is, the smaller the frequency of appearances is. Moreover, the histogram has a property that it is skewed to a lower degree of deviation as the value of a quantization parameter becomes larger.

The template shape setting units 306 and 316 create a histogram of an input group of degrees of deviation, divide the histogram into four so that the ratios between areas thereof are equal to each other, and set template shapes Tmp$_{Shape}$ for regions α to δ as follows. The value of a boundary between the regions α and β is denoted as Thα, the value of a boundary between the regions β and γ is denoted as Thβ, and the value of a boundary between the regions γ and δ is denoted as Thγ.

(1) If the degree of deviation is smaller than the threshold Thα, Tmp$_{Shape}$=None (the number of elements is 0).

When Tmp$_{Shape}$ is None, template matching is not performed.

(2) If the degree of deviation is larger than or equal to the threshold Thα and smaller than Thβ, Tmp$_{Shape}$=Point (the number of elements is 1).

When Tmp$_{Shape}$ is Point, only SSD for a target pixel and a pixel of a search point is calculated.

(3) If the degree of deviation is larger than or equal to the threshold Thβ and smaller than Thγ, Tmp$_{Shape}$=Cross (the number of elements is 5).

When Tmp$_{Shape}$ is Cross, matching is performed using a template shape of five pixels including the target pixel and four (top, bottom, left, and right) pixels.

(4) If the degree of deviation is larger than or equal to the threshold Thγ, Tmp$_{Shape}$=Block$_{3\times3}$ (the number of elements is 9).

When the Tmp$_{Shape}$ is Block$_{3\times3}$, matching is performed for all the points of a template shape of a 3×3 block.

Compared to a technique of performing matching for all the points of a template shape of a 3×3 block and for all the search points, the following computational complexities are obtained by introducing the present technique.

Region α: computational complexity 0
Region β: computational complexity ⅑
Region γ: computational complexity ⅝
Region δ: computational complexity 1

Since each region occupies ¼ of the entire frame, the total computational complexity is 5/12, and the theoretical value of the computational complexity can be reduced to approximately a little less than ½.

The following is the reason why the template shape is determined in accordance with the size of the degree of deviation in this manner. A signal having a high degree of deviation tends to appear in the surroundings of a strong edge, and then a weak edge, mosquito noise due to DCT, noise at the time of taking an image, and so on appear as a signal having a low degree of deviation to a medium degree of deviation. Since an NLM filter has a property that it is effective particularly in the surroundings of an edge, the present embodiment allocates a large template shape to a region (region δ) where the degree of deviation is high, thereby suppressing a deterioration in the denoising effect.

Example 2 of Template Shape Setting Method

As another example of the template shape setting methods in the template shape setting units 306 and 316, an example of a reduction in template shape for all the points of a reference template shape of an N×N block that is given from an apparatus using a group of degrees of deviation calculated by the deviation degree detection units 305 and 315 will be given.

Figure 14A:
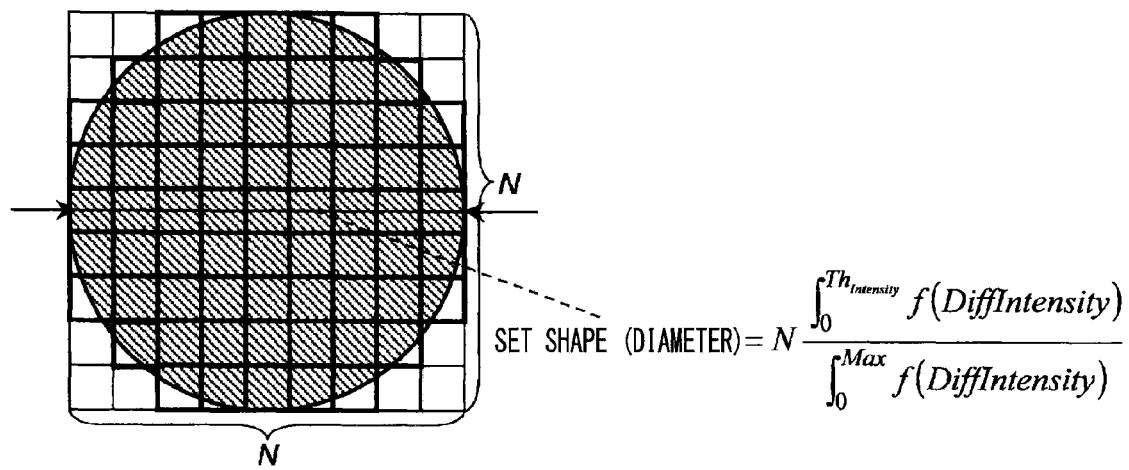
FIG. 14A is a diagram describing an example of the setting of the number of samples in accordance with the ratio of integration.
Figure 14B:
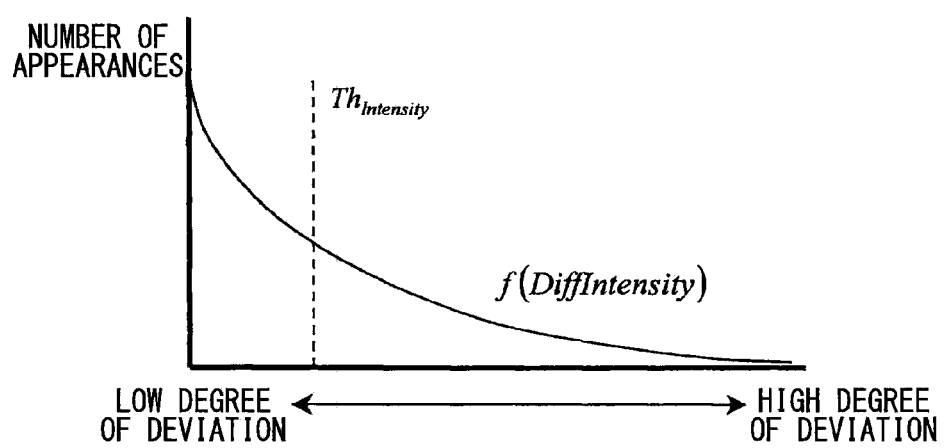
FIG. 14B is a diagram describing the example of the setting of the number of samples in accordance with the ratio of integration.

FIG. 14A to FIG. 14B are diagrams describing an example of the setting of the number of samples in accordance with the ratio of integration. The template shape setting units 306 and 316 create a histogram of the group of degrees of deviation, and set a template shape using the ratio between integrated values of a function f (DiffIntensity) (FIG. 14B) representing the distribution of the degrees of deviation, where the degree of deviation of a denoising target pixel on the histogram is denoted as Th$_{intensity}$.

That is, when the reference template shape is given as an N×N block as shown in FIG. 14A, the reduced template shape is set to a circle and its diameter is determined as follows.

Set shape (diameter)=N×[{integrated value of $f$ (DiffIntensity) from 0 to Th$_{intensity}$}/{integrated value of $f$ (DiffIntensity) from 0 to maximum value Max}]

Accordingly, it is possible to perform effective template matching by using a small template shape when the degree of deviation is low and using a large template shape when the degree of deviation is high.

Example 1 of Edge Direction Detection Method

As one of examples of the edge direction detection method in the edge direction detection unit 317, an example in which a Sobel filter is applied to a decoded image to detect an edge direction and a number allocated in accordance with the direction is output will be given.

Figures 15A, 15B:
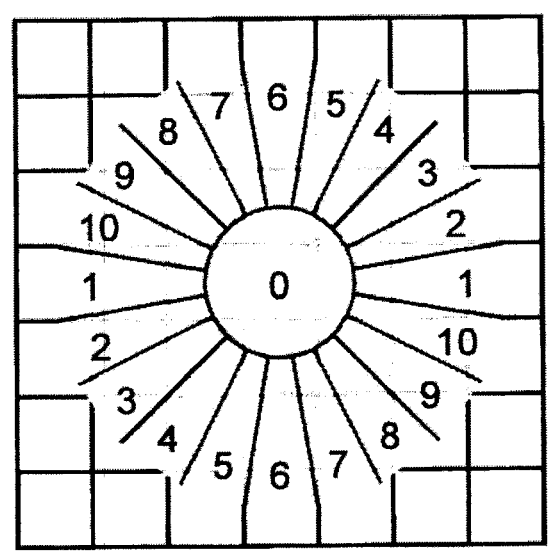
FIG. 15A is a diagram describing a Sobel operator in an example of an edge direction detection method.
FIG. 15B is a diagram describing numbers in accordance with directions in the example of the edge direction detection method.

FIG. 15A to FIG. 15C are diagrams describing the example of the edge direction detection method (the Sobel filter and numbers in accordance with directions). A Sobel operator as shown in FIG. 15A is applied to surrounding pixels, and numbers VecIndices (0 to 10) are allocated in accordance with detected edge directions as shown in FIG. 15B. At this time, a single threshold Th is set, 0 is allocated to VecIndex if the absolute sum of components in the x-axis and the y-axis (dx and dy) is smaller than the threshold Th because it is considered that no strong edge exists in a target pixel, and numbers are output as a group of edge directions.

FIG. 15C illustrates an algorithm for allocating a number.

If $|dx|+|dy|<Th$, VecIndex=0.

If the above condition is not satisfied and dy=0, VecIndex=6.

If the above conditions are not satisfied and dx/dy<−8.0, VecIndex=6.

If the above conditions are not satisfied and dx/dy<−2.0, VecIndex=7.

If the above conditions are not satisfied and dx/dy<−1.0, VecIndex=8.

If the above conditions are not satisfied and dx/dy<−0.5, VecIndex=9.

If the above conditions are not satisfied and dx/dy<−0.125, VecIndex=10.

If the above conditions are not satisfied and dx/dy<0.125, VecIndex=1.

If the above conditions are not satisfied and dx/dy<0.5, VecIndex=2.

If the above conditions are not satisfied and dx/dy<1.0, VecIndex=3.

If the above conditions are not satisfied and dx/dy<2.0, VecIndex=4.

If the above conditions are not satisfied and dx/dy<8.0, VecIndex=5.

If none the above conditions are satisfied, VecIndex=6.

In order to reduce the influence of mosquito noise due to DCT and noise at the time of taking an image and to reduce the computational complexity, it is also effective to apply a Sobel filter to an image obtained by scaling-down an input denoising target image to 1/N in the vertical direction and the horizontal direction instead of the input denoising target image, which is not scaled down.

When the Sobel filter is applied to the image scaled down to 1/N, an output calculation result of the Sobel filter is treated as a typical value of a group of a plurality of pixels used in the scaling-down.

Example 2 of Edge Direction Detection Method

As another example of the edge direction detection method in the edge direction detection unit 317, an example which applies a Sobel filter to a denoising target image to detect an edge direction and outputs an angle in radians (Radian) will be given. The above-described Sobel operator shown in FIG. 15A is applied to surrounding pixels, and the angle in radians is calculated from components in the x-axis and the y-axis (dx and dy) using arctan ($-\pi/2$ to $\pi/2$). At this time, when the absolute sum of dx and dy is smaller than a threshold Th, a value (EXa tan: e.g., 100) outside the output range of arctan ($-\pi/2$ to $\pi/2$) is set.

That is, the angle in radians (Radian) is defined as follows.

If $|dx|+|dy|<Th$, Radian=EXa tan.

If the above condition is not satisfied and dy=0, Radian=$\pi/2$.

Otherwise, Radian=arctan (dx/dy).

Example of Template Shape Resetting Method

As one of examples of the template shape resetting method in the template shape resetting unit 318, an example in which the template shape set by the template shape setting unit 316 shown in FIG. 9 is reset using the group of degrees of deviation output by the deviation degree detection unit 315 shown in FIG. 12B, the group of edge directions shown in FIG. 15B to FIG. 15C, and encoding information, to further reduce the size of the template shape will be described.

FIG. 16A to FIG. 16C are diagrams describing a template shape resetting method. First, a unit size of TransformUnit, which is a unit of a transform process such as DCT, is acquired from the encoding information, and N pixels in the vicinity of an outer edge of each unit is set as a setting target region as shown in FIG. 16A. With respect to the other regions, the setting result of the above-described template shape setting unit 316 is used without modification.

When a group of edge directions is used, as shown in FIG. 16B, VecIndices tend to be skewed to 1 at the top and bottom portions of the outer edge of the unit where there is noticeable block noise, VecIndices tend to be skewed to 6 at the left and right portions of the outer edge of the unit, and high degrees of deviation are detected at these boundary portions. Moreover, in a large quantization parameter region where noticeable block noise appears, a relatively flat region tends to appear inside TransformUnit.

That is, in a medium rate region to a low rate region where a quantization parameter QP is large, if the feature as shown in FIG. 16B is satisfied in the setting target region in FIG. 16A, there is a high possibility that block noise is generated. With respect to pixel positions at block boundaries where VecIndices are skewed to 1 or 6, the calculation result using a large template shape is almost the same as that using a small template shape. However, a large template shape is set if a sharp edge is detected at a block boundary, which results in inefficiency. Therefore, the template shape resetting unit 318 revises the template shape to solve the problem of inefficiency.

As a specific solving technique, for example, the following technique is conceivable. The following setting is performed on each pixel position using predetermined thresholds $Th1_{QP}$ and $Th2_{QP}$ (where $Th1_{QP}<Th2_{QP}$) for the quantization parameter QP and predetermined thresholds $Th1_{Diff}$ and $Th2_{Diff}$ (where $Th1_{Diff}<Th2_{Diff}$) for the degree of deviation DiffIntensity. By doing so, it is possible to reduce the computational complexity while suppressing a deterioration in the denoising effect. It is to be noted that it is assumed that $Th1_{Diff}$ and $Th2_{Diff}$ vary in accordance with the quantization parameter QP.

If the following condition is satisfied, a template shape $Tmp_{Shape}$ is set in accordance with a resetting branch algorithm described below.

[Condition 1]: VecIndices at target pixel positions in pixel positions in the setting target region of the top and bottom portions of the outer edge of the unit are 1 (a horizontal edge) or 0 (a flat region), and VecIndices at adjacent pixel positions inside the unit are 0 (a flat region).

[Condition 2]: Or, VecIndices at target pixel positions in pixel positions in the setting target region of the left and right portions of the outer edge of the unit are 6 (a vertical edge) or 0 (a flat region), and VecIndices at the adjacent pixel positions inside the unit is 0 (a flat region).

Example of "Resetting Branch Algorithm"

(1) If quantization parameter QP>threshold $Th2_{QP}$, template shape $Tmp_{Shape}$ is $Block_{3\times3}$ or Cross, and degree of deviation DiffIntensity>threshold $Th1_{Diff}$, $Tmp_{Shape}$ is reset to Point (the number of elements is 1).
(2) If the above condition is not satisfied, quantization parameter QP>threshold $Th1_{QP}$, template shape $Tmp_{Shape}$ is $Block_{3\times3}$, and degree of deviation DiffIntensity>threshold $Th2_{Diff}$, $Tmp_{Shape}$ is reset to Point (the number of elements is 1).
(3) If the above conditions are not satisfied, quantization parameter QP>threshold $Th1_{QP}$, template shape $Tmp_{Shape}$ is $Block_{3\times3}$, and degree of deviation DiffIntensity>threshold $Th1_{Diff}$, $Tmp_{Shape}$ is reset to Cross (the number of elements is 5).
(4) If the above conditions are not satisfied, quantization parameter QP>threshold $Th1_{QP}$, template shape $Tmp_{Shape}$ is Cross, and degree of deviation DiffIntensity>$Th1_{Diff}$, $Tmp_{Shape}$ is reset to Point (the number of elements is 1).
(5) If the above conditions (1) to (4) are not satisfied, the processing is completed without resetting $Tmp_{Shape}$.

Since VecIndices generated by block noise cannot be predicted for regions E, F, G, and H at four corners in FIG. 16C, the template shape is reset for all the pixel positions within the regions using the above-described resetting branches (1) to (5), if the following conditions are satisfied.

Region E: there is a pixel that satisfies the above conditions among a group of pixels of a region A, which is adjacent to the right thereof, and a group of pixels of a region C, which is adjacent to the below thereof.

Region F: there is a pixel that satisfies the above conditions among the group of pixels of the region A, which is adjacent to the left thereof, and a group of pixels of a region D, which is adjacent to the below thereof Region G: there is a pixel that satisfies the above conditions among a group of pixels of a region B, which is adjacent to the right thereof, and the group of pixels of the region C, which is adjacent to the above thereof Region H: there is a pixel that satisfies the above conditions among the group of pixels of the region B, which is adjacent to the left thereof, and the group of pixels of the region D, which is adjacent to the above thereof.

The present embodiment demonstrates an example in which the computational complexity is reduced for a group of pixels at block boundaries; to the contrary, an implementation in which $Tmp_{Shape}$ is set to None for the entire group of pixels inside a block, and a denoising filter is applied to only block boundaries to thereby greatly reduce the computational complexity is also possible.

[Effect of Reduction in Computational Complexity]

It was confirmed that when a denoising filter in accordance with the present technique is applied to encoding of standard video, it is possible to greatly reduce the computational complexity required for the above filter while suppressing a deterioration in peak signal-to-noise ratio (PSNR), compared to a technique which incorporates a conventional NLM filter (a denoising filter in accordance with the non-local means method) into the next-generation video coding standards.

Example of Configuration when Software Program is Used

The processes of the above image processing, video encoding, and video decoding can also be realized by a computer and a software program, the program can be recorded on a computer-readable recording medium, and the program can be provided through a network.

Figure 17:
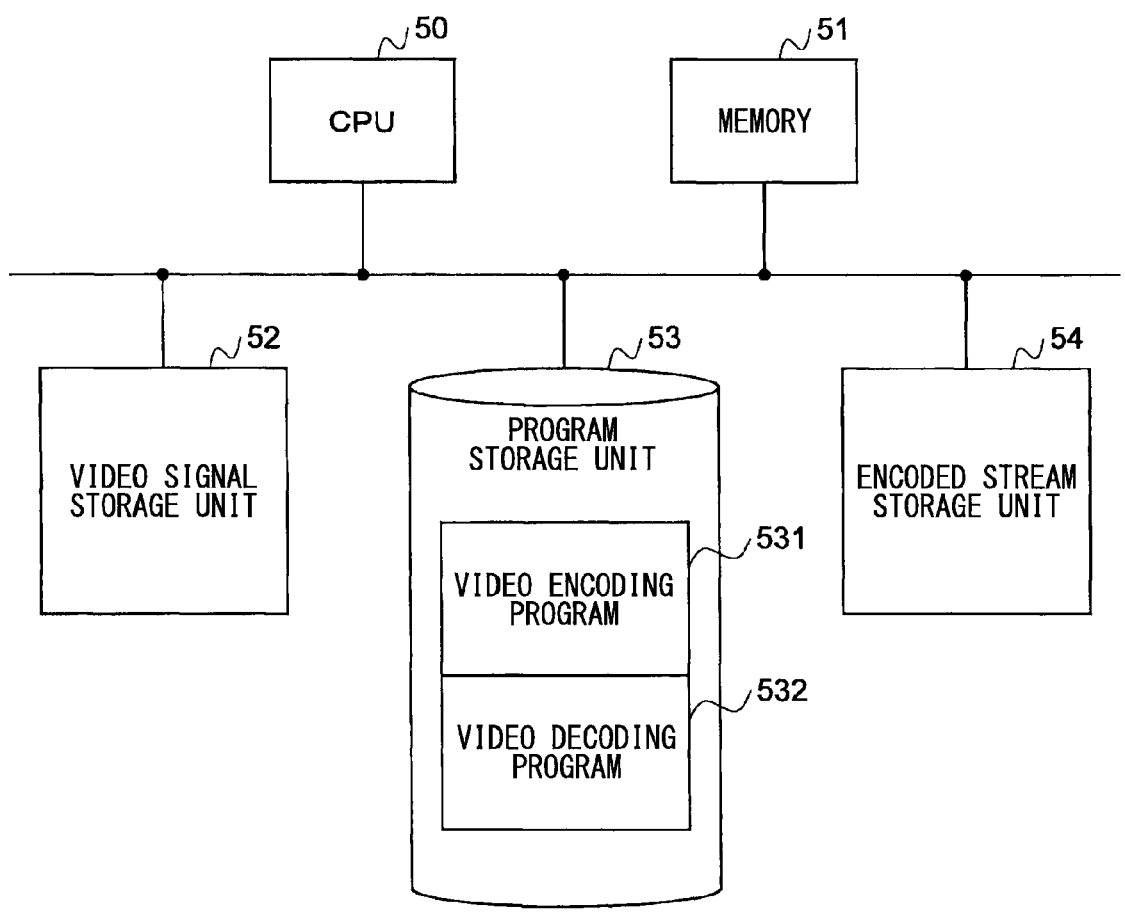
FIG. 17 is a diagram illustrating an example of a configuration of a system when an embodiment of the present invention is implemented using a software program.
Figure 18:
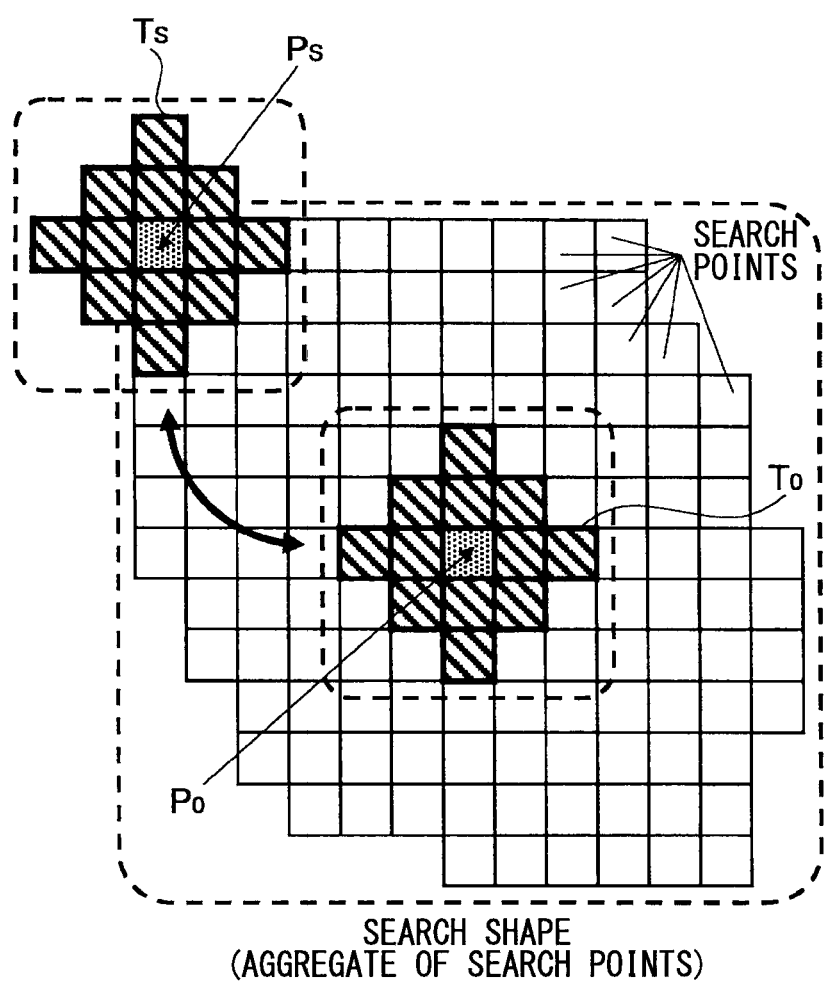
FIG. 18 is a diagram describing an NLM filter.
Figure 19:
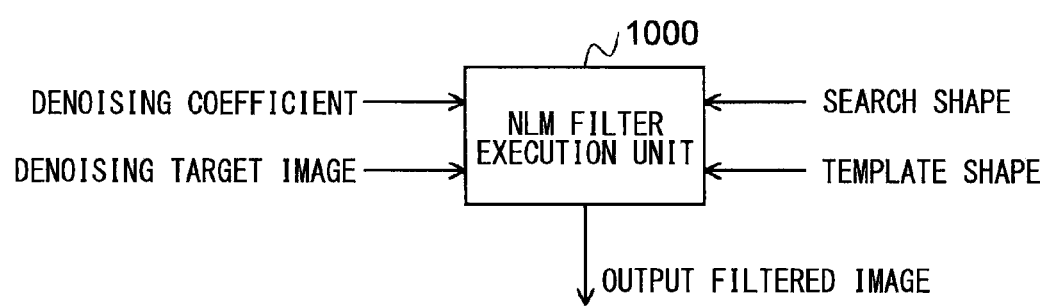
FIG. 19 is a diagram illustrating inputs and an output of an NLM filter execution unit.

FIG. 17 illustrates an example of a configuration of a system when an embodiment of the present invention is implemented using a computer and a software program.

The present system is configured such that a central processing unit (CPU) 50 which executes a program, a memory 51, such as a random access memory (RAM), which stores the program and data accessed by the CPU 50, a video signal storage unit 52 which stores an encoding target video signal or a video signal of decoded images, a program storage unit 53 which stores the program for making the CPU 50 execute the processes described in the embodiments of the present invention, and an encoded stream storage unit 54 which stores a bitstream as an encoding result or a decoding target bitstream are connected to each other through a bus.

The program storage unit 53 stores one of a video encoding program 531 for encoding a video signal using an embodiment of the present invention and a video decoding program 532 for decoding an encoded bitstream using an embodiment of the present invention. The program storage unit 53 may store both of these programs.

Moreover, when the present system is used as a video encoding apparatus, the video encoding program 531 is loaded on the memory 51, the CPU 50 sequentially fetches and executes instructions of the video encoding program 531 loaded on the memory 51, encodes a video signal stored in the video signal storage unit 52 using the technique described in an embodiment of the present invention, and stores a bitstream as an encoding result in the encoded stream storage unit 54. Alternatively, the bitstream may be output to an external apparatus through an interface such as a network adapter.

Moreover, when the present system is used as a video decoding apparatus, the video decoding program 532 is loaded on the memory 51, the CPU 50 sequentially fetches and executes instructions of the video decoding program 532 loaded on the memory 51, decodes a bitstream stored in the encoded stream storage unit 54 using the technique described in an embodiment of the present invention, and stores a video signal as a decoding result in the video signal storage unit 52. Alternatively, the video signal as the decoding result is output to an external reproduction apparatus.

Although embodiments of the present invention have been described above in detail with reference to the drawings, the specific configuration is not limited to these embodiments, and designs and so on (addition, omission, replacement, and other modifications of configuration) that do no depart from the gist of the present invention are also included. The present invention is not restricted by the above description, and is restricted only by the attached claims.

INDUSTRIAL APPLICABILITY

The present invention can be used, for example, in a loop filter which reduces block noise and so on in video encoding/decoding. The present invention can reduce the computational complexity of a denoising filter while suppressing a reduction in coding efficiency.

DESCRIPTION OF REFERENCE NUMERALS 30, 31, 113, 215 denoising filter processing unit
301, 311 denoising coefficient setting unit
302, 312 NLM filter execution unit

305, 315 deviation degree detection unit
306, 316 template shape setting unit
317 edge direction detection unit
318 template shape resetting unit

The invention claimed is:

1. A video encoding/decoding method which encodes or decodes video using a loop filter,
the loop filter being a filter which removes noise of a decoded image using an image processing method which performs template matching between a template which is a comparison source for a denoising target pixel in the decoded image and a template for each of search points which are search targets in a search shape in the decoded image, and removes noise of the target pixel using a weight in accordance with the degree of similarity between the templates and the weighted sum of pixel values at the search points,
the method executing:
a step of calculating the degree of deviation between the target pixel and a surrounding pixel of the target pixel using the decoded image; and
a step of limiting a template shape so that the lower the degree of deviation relative to the maximum value of the degree of deviation in the decoded image is, the smaller the template shape is, using the degree of deviation as an index used for limiting the template shape of the templates.

2. The video encoding/decoding method according to claim 1, the method executing:
a step of calculating an edge direction using the decoded image, which is a denoising target; and
a step of further limiting a template shape of one or a plurality of pixels at an outer edge of an encoding target block or a decoding target block in the limited template shape, based on the calculated edge direction, a quantization parameter of the encoding target block or the decoding target block, and the degree of deviation.

3. A video encoding/decoding apparatus which encodes or decodes video using a loop filter,
the loop filter being a filter which removes noise of a decoded image using an image processing method which performs template matching between a template which is a comparison source for a denoising target pixel in the decoded image and a template for each of search points which are search targets in a search shape in the decoded image, and removes noise of the target pixel using a weight in accordance with the degree of similarity between the templates and the weighted sum of pixel values at the search points,
the apparatus comprising:
a deviation degree calculating unit which calculates the degree of deviation between the target pixel and a surrounding pixel of the target pixel using the decoded image; and
a template shape setting unit which limits a template shape so that the lower the degree of deviation relative to the maximum value of the degree of deviation in the decoded image is, the smaller the template shape is, using the degree of deviation as an index used for limiting the template shape of the templates.

4. The video encoding/decoding apparatus according to claim 3, the apparatus further comprising:
an edge direction detection unit which calculates an edge direction using the decoded image, which is a denoising target; and
a template shape resetting unit which further limits a template shape of one or a plurality of pixels at an outer edge of an encoding target block or a decoding target block in the limited template shape, based on the calculated edge direction, a quantization parameter of the encoding target block or the decoding target block, and the degree of deviation.

5. A non-transitory computer-readable medium storing instructions, the instructions causing a processor to perform the video encoding/decoding method according to claim 1.

6. A non-transitory computer-readable medium storing instructions, the instructions causing a processor to perform the video encoding/decoding method according to claim 2.

* * * * *